US012666250B2

(12) United States Patent
Yu et al.

(10) Patent No.: US 12,666,250 B2
(45) Date of Patent: Jun. 23, 2026

(54) SOUNDING REFERENCE SIGNAL TRANSMISSION METHOD AND APPARATUS

(71) Applicant: HUAWEI TECHNOLOGIES CO., LTD., Shenzhen (CN)

(72) Inventors: Zheng Yu, Beijing (CN); Mengting Liu, Beijing (CN); Jianghua Liu, Beijing (CN); Xin Gao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 254 days.

(21) Appl. No.: 18/343,741

(22) Filed: Jun. 29, 2023

(65) Prior Publication Data

US 2023/0345230 A1     Oct. 26, 2023

Related U.S. Application Data

(63) Continuation of application No. PCT/CN2021/070379, filed on Jan. 5, 2021.

(51) Int. Cl.
*H04L 5/00*          (2006.01)
*H04W 8/22*          (2009.01)
(Continued)

(52) U.S. Cl.
CPC ............. *H04W 8/22* (2013.01); *H04L 5/0051* (2013.01)

(58) Field of Classification Search
CPC ......... H04W 8/22; H04W 8/24; H04W 72/21; H04W 72/0446; H04W 72/0453;
(Continued)

(56) References Cited

U.S. PATENT DOCUMENTS

| 10,700,844 B2 * | 6/2020 | Liu ....................... H04L 5/0048 |
| 12,058,070 B2 * | 8/2024 | Abdelghaffar ........ H04L 5/0051 |

(Continued)

FOREIGN PATENT DOCUMENTS

| CN | 111082839 A | 4/2020 |
| CN | 111698782 A | 9/2020 |

(Continued)

OTHER PUBLICATIONS

3GPP 5G, "5G; NR; User Equipment (UE) radio access capabilities (3GPP TS 38.306 version 15.5.0 Release 15)," ETSI TS 138 306 V15.5.0 (May 2019). (Year: 2019).*

(Continued)

*Primary Examiner* — Alina A Boutah

(57) ABSTRACT

A communication method and apparatus. The communication method includes: A terminal device transmits first capability information to a first network device, where the first capability information indicates that the terminal device supports sending a sounding reference signal (SRS) by using a maximum of a first bandwidth size of bandwidth; the terminal device transmits second capability information to a second network device, where the second capability information indicates that the terminal device supports sending data or control information by using a maximum of a second bandwidth size of bandwidth; the terminal device obtains first configuration information indicating that a size of bandwidth configured for the SRS is not greater than the first bandwidth size; and the terminal device obtains second configuration information indicating that a size of bandwidth configured for the data or control information is not greater than the second bandwidth size.

18 Claims, 7 Drawing Sheets

(51) Int. Cl.

| | |
|---|---|
| *H04W 8/24* | (2009.01) |
| *H04W 72/21* | (2023.01) |
| *H04W 72/231* | (2023.01) |

(58) Field of Classification Search

CPC . H04W 72/231; H04W 72/232; H04W 24/10; H04W 4/02; H04L 5/0051; H04L 5/0032; H04L 5/0094; H04L 5/0053; H04L 5/0048; H04L 5/00; H04L 5/001; H04L 27/26025; Y02D 30/70

See application file for complete search history.

(56) References Cited

U.S. PATENT DOCUMENTS

| | | | |
|---|---|---|---|
| 2014/0211740 A1 | 7/2014 | Berggren | |
| 2019/0053103 A1* | 2/2019 | Manolakos | H04L 5/0051 |
| 2020/0037246 A1* | 1/2020 | Hwang | H04W 52/0216 |
| 2020/0112349 A1 | 4/2020 | Yang et al. | |
| 2020/0204313 A1 | 6/2020 | Choi et al. | |
| 2020/0252116 A1 | 8/2020 | Lee et al. | |
| 2020/0350970 A1* | 11/2020 | Liu | H04L 5/0048 |
| 2020/0382945 A1 | 12/2020 | Yang | |
| 2021/0195654 A1* | 6/2021 | Lei | H04W 72/21 |
| 2023/0036057 A1* | 2/2023 | Lei | H04W 8/22 |
| 2023/0141170 A1* | 5/2023 | Dai | H04L 5/0007 |
| | | | 370/329 |
| 2023/0189271 A1* | 6/2023 | Liu | H04W 76/10 |
| | | | 455/452.1 |

FOREIGN PATENT DOCUMENTS

| | | | | | |
|---|---|---|---|---|---|
| CN | 111769857 | A | * | 10/2020 | H04W 72/54 |
| CN | 109196929 | B | | 11/2020 | |
| CN | 109804575 | B | * | 7/2022 | H04B 17/382 |
| CN | 114765728 | A | * | 7/2022 | H04W 4/02 |
| CN | 115379571 | A | * | 11/2022 | H04W 72/12 |
| CN | 116210288 | A | * | 6/2023 | H04W 76/14 |
| EP | 4231567 | A1 | * | 8/2023 | H04L 5/0053 |
| JP | 2015111936 | A | | 6/2015 | |
| JP | 2020507989 | A | | 3/2020 | |
| JP | 7584626 | B2 | * | 11/2024 | H04L 5/14 |
| KR | 20220119022 | A | * | 8/2022 | H04W 72/21 |
| KR | 20230051493 | A | * | 4/2023 | H04L 5/005 |
| KR | 20250079040 | A | * | 6/2025 | H04W 74/002 |
| WO | WO-2015022137 | A1 | * | 2/2015 | H04L 5/0051 |
| WO | WO-2020192782 | A1 | * | 10/2020 | H04W 72/23 |
| WO | WO-2022077351 | A1 | * | 4/2022 | H04W 72/04 |
| WO | WO-2022099523 | A1 | * | 5/2022 | H04L 5/0053 |

OTHER PUBLICATIONS

Moloudi et al., "Coverage Evaluation for 5G Reduced Capability New Radio (NR-RedCap),", accepted Mar. 3, 2021, date of publication Mar. 15, 2021, date of current version Mar. 26, 2021. Digital Object Identifier 10.1109/ACCESS.2021.3066036 (Year: 2021).*

ETSI TS 138 306 V16.3.0 (Jan. 2021), "5G; NR; User Equipment (UE) radio access capabilities(3GPP TS 38.306 version 16.3.0 Release 16)", Dec. 31, 2020, total 134 pages.

3GPP TR 22.804 V16.3.0 (Jul. 2020), 3rd Generation Partnership Project;Technical Specification Group Services and System Aspects;Study on Communication for Automation in Vertical Domains(Release 16), 197 pages.

3GPP TS 37.355 V16.2.0 (Sep. 2020), 3rd Generation Partnership Project;Technical Specification Group Radio Access Network;LTE Positioning Protocol (LPP)(Release 16), 296 pages.

3GPP TS 38.331 V16.2.0 (Sep. 2020), 3rd Generation Partnership Project;Technical Specification Group Radio Access Network; NR;Radio Resource Control (RRC) protocol specification(Release 16), 926 pages.

R1-2008168, Samsung, Potential positioning enhancements, 3GPP TSG RAN WG1 #103-e, e-Meeting, Oct. 26-Nov. 13, 2020, 6 pages.

R1-2008083, Xiaomi, Potential positioning enhancements, 3GPP TSG RAN WG1 #103-e, e-Meeting, Oct. 26-Nov. 13, 2020, 5 pages.

3GPP TS 38.211 V16.3.0 (Sep. 2020), 3rd Generation Partnership Project;Technical Specification Group Radio Access Network;NR;Physical channels and modulation(Release 16), 133 pages.

3GPP TS 38.306 V16.2.0 (Sep. 2020),3rd Generation Partnership Project;Technical Specification Group Radio Access Network;NR;User Equipment (UE) radio access capabilities (Release 16),XP51961365A,total 126 pages.

3GPP TSG RAN WG1 Meeting #103-e,R1-2007577,"Positioning enhancement in Rel-17",Huawei, HiSilicon,E-meeting,Oct. 26-Nov. 13, 2020,XP52348932A,total 17 pages.

3rd Generation Partnership Project;Technical Specification Group Radio Access Network;NR;Physical layer procedures for data(Release 16),3GPP TS 38.214 V16.3.0 (Sep. 2020),total:166pages.

* cited by examiner

*f*

CC₃
100 MHz

Single carrier
transmission of a
positioning SRS

CC₂
100 MHz

CC₁
100 MHz

*T*          *2T*          *3T*          *t*

SOUNDING REFERENCE SIGNAL TRANSMISSION METHOD AND APPARATUS

CROSS-REFERENCE TO RELATED APPLICATIONS

This application is a continuation of International Application No. PCT/CN2021/070379, filed on Jan. 5, 2021, the disclosure of which is hereby incorporated by reference in its entirety.

TECHNICAL FIELD

Embodiments of this application relate to the communication field, and in particular, to a communication method and apparatus.

BACKGROUND

Currently, enhanced mobile broadband (eMBB) user equipment (UE) exists in a 5G system. In addition, because internet of things services (such as wearables, industrial sensors, and video surveillance) have a requirement for low costs and low complexity of a terminal device, reduced capability (RedCap) UE is proposed. This type of UE is referred to as low-complexity (or low-capability, or low-cost) UE. Compared with the eMBB UE, the RedCap UE has one or more of the following characteristics: low device complexity and low device size.

Based on the foregoing description, different types of UEs have different requirements. Currently, no related technology is applicable to a communication problem between the RedCap UE and different network devices.

SUMMARY

Embodiments of this application provide a communication method and apparatus. A terminal device independently reports capability information of supporting sending and/or receiving a reference signal. This resolves a communication problem of the terminal device that supports sending and/or receiving a reference signal.

To resolve the foregoing technical problem, embodiments of this application provide the following technical solutions.

According to a first aspect, an embodiment of this application provides a communication method. The communication method includes: A terminal device transmits first capability information to a first network device, where the first capability information indicates that the terminal device supports sending and/or receiving first information by using a maximum of a first quantity of resources, and the first information includes a reference signal; the terminal device transmits second capability information to a second network device, where the second capability information indicates that the terminal device supports sending and/or receiving second information by using a maximum of a second quantity of resources, and the second information includes at least one of the following: data or control information; the terminal device obtains first configuration information, where the first configuration information indicates that a quantity of resources configured for the first information is not greater than the first quantity; and the terminal device obtains second configuration information, where the second configuration information indicates that a quantity of resources configured for the second information is not greater than the second quantity.

In the foregoing technical solution, the terminal device may establish a communication connection to at least one network device. For example, the terminal device reports a plurality of pieces of capability information to the network device. The terminal device may report a plurality of pieces of capability information to one network device, or the terminal device separately reports a plurality of pieces of capability information to different network devices. For example, the terminal device transmits the first capability information to the first network device, where the first capability information indicates that the terminal device supports sending and/or receiving the first information by using a maximum of the first quantity of resources, and the first information includes the reference signal. The terminal device transmits the second capability information to the second network device (the second network device and the first network device may be a same network device), where the second capability information indicates that the terminal device supports sending and/or receiving the second information by using a maximum of the second quantity of resources, and the second information includes at least one of the following: the data or the control information. The terminal device obtains the first configuration information, where the first configuration information indicates that the quantity of resources configured for the first information is not greater than the first quantity. The terminal device obtains the second configuration information, where the second configuration information indicates that the quantity of resources configured for the second information is not greater than the second quantity. In this embodiment of this application, the terminal device may report, by using the first capability information, that the terminal device supports sending and/or receiving the reference signal by using a maximum of the first quantity of resources, and the terminal device may report, by using the second capability information, that the terminal device supports sending and/or receiving the second information by using a maximum of the second quantity of resources. This avoids that the terminal device sends and/or receives the second information by using the first quantity of resources, and this reduces complexity of the terminal device and reduces power consumption overheads of the terminal device.

In an implementation, the first quantity is greater than the second quantity.

In the foregoing technical solution, the first quantity is a quantity of resources indicated in the first capability information, and the second quantity is a quantity of resources indicated in the second capability information. The first capability information is used to request a resource corresponding to the first information (for example, the first information is the reference signal), and the second capability information is used to request a resource corresponding to the second information (for example, the second information is the data or the control information). In this case, the first quantity is greater than the second quantity. In other words, the terminal device may request a large quantity of resources for sending the reference signal, and request a small quantity of resources for sending the data. Therefore, a high-precision positioning requirement of the terminal device (for example, RedCap UE) may be implemented without greatly increasing complexity/costs/power consumption of the UE.

In an implementation, the first quantity belongs to a first quantity set, and at least one quantity in the first quantity set is greater than the second quantity;

the first quantity belongs to a first quantity set, the second quantity is predefined, and at least one quantity in the first quantity set is greater than the second quantity;

the first quantity belongs to a first quantity set, the second quantity belongs to a second quantity set, and at least one quantity in the first quantity set is greater than the second quantity;

the first quantity belongs to a first quantity set, the second quantity belongs to a second quantity set, and at least one quantity in the first quantity set is greater than all quantities in the second quantity set;

the first quantity is predefined, the second quantity is predefined, and the first quantity is greater than the second quantity; or the first quantity is predefined, the second quantity is predefined, and the first quantity is not greater than the second quantity.

In the foregoing technical solution, the first quantity and the second quantity are separately determined by the terminal device. For example, the first quantity belongs to the first quantity set, and at least one quantity in the first quantity set is greater than the second quantity. An implementation of the first quantity set is not limited in this embodiment of this application. For example, the first quantity set may include one component element, or include a plurality of component elements, where the component element is a quantity that constitutes the first quantity set. At least one quantity in the first quantity set is greater than the second quantity. Therefore, the first quantity may be greater than the second quantity. A value of the first quantity is not limited herein.

For example, the first quantity belongs to the first quantity set, the second quantity is predefined, at least one quantity in the first quantity set is greater than the second quantity, and the second quantity is predefined by the terminal device. For example, the terminal device predefines that a bandwidth of the second quantity is 20 MHz, 40 MHz, or 5 MHz, or predefines that a bandwidth of the second quantity is 51 resource blocks (or 106 resource blocks, or 11 resource blocks). The first quantity set may include one component element, or include a plurality of component elements, where the component element is a quantity that constitutes the first quantity set. At least one quantity in the first quantity set is greater than the second quantity. Therefore, the first quantity may be greater than the second quantity. A value of the first quantity is not limited herein.

For example, the first quantity belongs to the first quantity set, the second quantity belongs to the second quantity set, and at least one quantity in the first quantity set is greater than the second quantity. In this embodiment of this application, implementations of the first quantity set and the second quantity set are not limited. For example, the first quantity set may include one component element, or include a plurality of component elements, where the component element is a quantity that constitutes the first quantity set. The second quantity set may include one component element, or include a plurality of component elements, where the component element is a quantity that constitutes the second quantity set. At least one quantity in the first quantity set is greater than the second quantity. Therefore, the first quantity may be greater than the second quantity. A value of the first quantity is not limited herein.

For example, the first quantity belongs to the first quantity set, the second quantity belongs to the second quantity set, and at least one quantity in the first quantity set is greater than all quantities in the second quantity set. In this embodiment of this application, implementations of the first quantity set and the second quantity set are not limited. For example, the first quantity set may include one component element, or include a plurality of component elements, where the component element is a quantity that constitutes the first quantity set. The second quantity set may include one component element, or include a plurality of component elements, where the component element is a quantity that constitutes the second quantity set. At least one quantity in the first quantity set is greater than all the quantities in the second quantity set. Therefore, the first quantity may be greater than the second quantity. A value of the first quantity is not limited herein.

In this embodiment of this application, values of the first quantity and the second quantity may be predefined. The terminal device may indicate, by using the first capability information, whether the first quantity takes effect. In addition, the terminal device may indicate, by using the second capability information, whether the second quantity takes effect. It should be noted that the terminal device may separately configure the first capability information and the second capability information. When the first quantity is greater than the second quantity, a high-precision positioning requirement of the terminal device (for example, RedCap UE) may be implemented without greatly increasing complexity/costs/power consumption of the UE. When the first quantity is not greater than the second quantity, a transmission bandwidth capability of a positioning reference signal may be less than a bandwidth capability of data transmission, and the positioning reference signal may not be sent on a full bandwidth. This can effectively reduce power consumption of the UE.

In an implementation, the resource is one or more of a bandwidth, a resource block, a carrier, a subband, a frequency range, a frequency segment, a frequency band, a subcarrier spacing, a bandwidth part BWP, a frequency hopping interval, and a quantity of frequency hops within a specific time range.

In the foregoing technical solution, the resource defined in this embodiment of this application has a plurality of implementations. For example, the resource may be a bandwidth, or the resource may be a resource block. This is not limited in this embodiment of this application. Related concepts of a bandwidth, a resource block, a carrier, a subband, a frequency range, a frequency segment, a frequency band, a subcarrier spacing, a BWP, a frequency hopping interval, and a quantity of frequency hops within a specific time range are not described herein again.

In an implementation, the method further includes:

the terminal device sends third capability information to the first network device or the second network device. The third capability information indicates:

whether the terminal device supports sending and/or receiving the first information in a carrier aggregation manner; and/or the terminal device supports sending and/or receiving the first information by using a maximum of M carriers, where M is a positive integer.

In the foregoing technical solution, the third capability information indicates whether the terminal device supports sending and/or receiving the first information in the carrier aggregation manner. For example, the third capability information may be 1-bit indication information, and the indication information indicates whether the terminal device supports sending and/or receiving the first information in the carrier aggregation manner. In addition, the third capability information indicates that the terminal device supports sending and/or receiving the first information by using a maximum of the M carriers, where M is a positive integer. For example, a value of M may be carried in the third capability information. That the terminal device sends and/or receives the first information by using a maximum of the M carriers means that a maximum of carriers used by the terminal device can be the M carriers. The terminal device sends the third capability information, so that the first network device or the second network device may determine whether the terminal device uses carrier aggregation and determine a quantity of carriers used for aggregation.

In an implementation, the method further includes:

the terminal device sends fourth capability information to the first network device or the second network device.

The fourth capability information indicates:

the terminal device does not support sending and/or receiving the second information in a carrier aggregation manner; or the terminal device supports sending and/or receiving the second information by using a maximum of N carriers, where N is a positive integer.

In the foregoing technical solution, the fourth capability information indicates whether the terminal device supports sending and/or receiving the second information in the carrier aggregation manner. For example, the fourth capability information may be 1-bit indication information, and the indication information indicates that the terminal device does not support sending and/or receiving the second information in the carrier aggregation manner. In addition, the fourth capability information indicates that the terminal device supports sending and/or receiving the second information by using a maximum of the N carriers, where N is a positive integer. For example, a value of N may be carried in the fourth capability information. That the terminal device sends and/or receives the second information by using a maximum of the N carriers means that a maximum of carriers used by the terminal device can be the N carriers. The terminal device sends the fourth capability information, so that the first network device or the second network device may determine that the terminal device does not use carrier aggregation and determine a quantity of carriers used for aggregation.

In an implementation, N is less than M; or

N is not greater than M.

In the foregoing technical solution, when N is less than M, a high-precision positioning requirement of the terminal device (for example, RedCap UE) may be implemented without greatly increasing complexity/costs/power consumption of the UE. That N is not greater than M means that N is less than M, or N=M. When N is less than M, a high-precision positioning requirement of the terminal device (for example, RedCap UE) may be implemented without greatly increasing complexity/costs/power consumption of the UE. When N=M, a transmission bandwidth capability of a positioning reference signal is equal to a bandwidth capability of data transmission. This simplifies a configuration manner of a transmission bandwidth of the positioning reference signal and a bandwidth of data transmission.

In an implementation, the method further includes:

the terminal device sends fifth capability information to the first network device or the second network device.

The fifth capability information indicates:

the terminal device supports generating the first information according to a first algorithm;

the terminal device supports generating the first information according to a second algorithm; or the terminal device supports generating the first information according to a first algorithm and a second algorithm.

The first algorithm and the second algorithm are different algorithms.

In the foregoing technical solution, the algorithm in this embodiment of this application may be a sequence generation method. Content or quantities of sequences generated by different algorithms are not completely the same. For example, a sequence ID used when the first algorithm generates a sequence is in a range of $\{0, \ldots, 1023\}$. For example, a sequence ID used when the second algorithm generates a sequence is in a range of $\{0, \ldots, 65535\}$.

In an implementation, the method further includes:

the terminal device sends sixth capability information to the first network device or the second network device.

The sixth capability information includes at least one type of the following information: scrambling code information, location information, period information, interval information, frequency hopping information, density information, reserved time information, tuning time information, nonsimultaneous transmit information, and nonsimultaneous receive information.

The scrambling code information includes at least one of the following: a scrambling code range and a scrambling code value set.

The location information is a location at which the first information is sent and/or received and that can be supported by the terminal device.

The period information is a period in which the first information is sent and/or received and that can be supported by the terminal device.

The interval information is an interval that is between two consecutive times of sending and/or receiving the first information and that can be supported by the terminal device.

The frequency hopping information is one or more of whether the terminal device supports sending and/or receiving the first information in a frequency hopping manner, a quantity of hops for sending and/or receiving the first information in a specific time, a quantity of resource blocks RBs occupied for sending and/or receiving the first information at each hop, a resource width for sending and/or receiving the first information corresponding to each hop, a frequency hopping offset for sending and/or receiving the first information, a frequency resource range for sending and/or receiving the first information in a frequency hopping manner, and subcarrier spacing information for sending and/or receiving the first information.

The density information is a quantity of times that the terminal device sends and/or receives the first information within a specific time range.

The reserved time information is a time length that needs to be reserved before the terminal device sends and/or receives the first information, a time length that needs to be reserved after the terminal device sends and/or receives the first information, a time length that needs to be reserved between two times of sending the first information by the terminal device, or a time length that needs to be reserved between two times of receiving the first information by the terminal device.

The tuning time information is switching time between one time of sending first information by the terminal device and next time of sending first information, or switching time between one time of receiving first information by the terminal device and next time of receiving first information.

The nonsimultaneous transmit information indicates that when sending the first information, the terminal device does not support sending information other than the first information.

The nonsimultaneous receive information indicates that when receiving the first information, the terminal device does not support receiving information other than the first information.

In the foregoing technical solution, the terminal device obtains the sixth capability information. The sixth capability information has a plurality of implementations. For example, the sixth capability information includes at least one of the following: scrambling code information, location information, period information, interval information, frequency hopping information, density information, guard time information, tuning time information, nonsimultaneous transmit information, and nonsimultaneous receive information. The terminal device may indicate, to the first network device by using the sixth capability information, a capability of the terminal device for the scrambling code information, the location information, the period information, the interval information, the frequency hopping information, the density information, the guard time information, the tuning time information, the nonsimultaneous transmit information, and the nonsimultaneous receive information.

In an implementation, the first configuration information includes a configuration of a manner of sending and/or receiving the first information.

The manner of sending and/or receiving the first information includes: The terminal device sends and/or receives the first information based on the first capability information, or the terminal device sends and/or receives the first information based on the second capability information; or the manner of sending and/or receiving the first information includes: The terminal device generates the first information according to the first algorithm, or generates the first information according to the second algorithm, where the first algorithm and the second algorithm are different algorithms.

In the foregoing technical solution, the terminal device may obtain, by using the first configuration information, the configuration of the manner of sending and/or receiving the first information, so that the terminal device sends and/or receives the first information.

In an implementation, the first configuration information includes information about sending and/or receiving the first information.

The information about sending and/or receiving the first information includes at least one of the following: scrambling code information, location information, period information, interval information, frequency hopping information, density information, guard time information, tuning time information, nonsimultaneous transmit information, and nonsimultaneous receive information.

The scrambling code information includes at least one of the following: a scrambling code range and a scrambling code value set.

The location information is a location at which the first information is sent and/or received and that can be supported by the terminal device.

The period information is a period in which the first information is sent and/or received and that can be supported by the terminal device.

The interval information is an interval that is between two consecutive times of sending and/or receiving the first information and that can be supported by the terminal device.

The frequency hopping information is one or more of whether the terminal device supports sending and/or receiving the first information in a frequency hopping manner, a quantity of hops for sending and/or receiving the first information in specific time, a quantity of resource blocks RBs occupied for sending and/or receiving the first information at each hop, a resource width for sending and/or receiving the first information corresponding to each hop, a frequency hopping offset for sending and/or receiving the first information, a frequency resource range for sending and/or receiving the first information in a frequency hopping manner, and subcarrier spacing information for sending and/or receiving the first information.

The density information is a quantity of times that the terminal device sends and/or receives the first information within a specific time range.

The reserved time information is a time length that needs to be reserved before the terminal device sends and/or receives the first information, a time length that needs to be reserved after the terminal device sends and/or receives the first information, a time length that needs to be reserved between two times of sending the first information by the terminal device, or a time length that needs to be reserved between two times of receiving the first information by the terminal device.

The tuning time information is switching time between one time of sending first information by the terminal device and next time of sending first information, or switching time between one time of receiving first information by the terminal device and next time of receiving first information.

The nonsimultaneous transmit information indicates that when sending the first information, the terminal device does not support sending information other than the first information.

The nonsimultaneous receive information indicates that when receiving the first information, the terminal device does not support receiving information other than the first information.

In the foregoing technical solution, the terminal device obtains the first configuration information. The first configuration information has a plurality of implementations, for example, information about sending and/or receiving the first information, for example, information about sending the first information, or information about receiving the first information. The information about sending and/or receiving the first information includes at least one of the following: scrambling code information, location information, period information, interval information, frequency hopping information, density information, guard time information, tuning time information, nonsimultaneous transmit information nonsimultaneous receive information. The terminal device may obtain, by using the first configuration information, information for sending and/or receiving the first information, so that the terminal device sends and/or receives the first information.

In an implementation, the first configuration information includes at least one of the following: whether frequency hopping is enabled, a frequency hopping time domain configuration, and a frequency hopping frequency domain configuration.

The frequency hopping time domain configuration includes at least one of the following: a start location, an interval, a period, a quantity of symbols occupied by each hop, and a frame or slot configuration.

The frequency hopping frequency domain configuration includes at least one of the following: a start RB location, a quantity of RBs occupied by each hop, a resource width corresponding to each hop, a quantity of hops on a frequency corresponding to specific time, a frequency resource range of frequency hopping, subcarrier spacing information, and a frequency hopping offset.

In the foregoing technical solution, whether frequency hopping is enabled may be that frequency hopping is enabled or frequency hopping is not enabled. In addition, the first configuration information may further include the frequency hopping time domain configuration and the frequency hopping frequency domain configuration. Therefore, the terminal device can obtain, by using the first configuration information, frequency hopping information for sending and/or receiving the first information, so that the terminal device sends and/or receives the first information.

In an implementation, the first configuration information indicates that a manner of sending and/or receiving the first information is one of the following: {first mode, no frequency hopping}, {second mode, frequency hopping}, or {second mode, no frequency hopping}.

The first mode indicates that the terminal device sends and/or receives the first information based on the first capability information.

The second mode indicates that the terminal device sends and/or receives the first information based on the second capability information.

The no frequency hopping indicates that the terminal device does not support sending and/or receiving the first information in a frequency hopping manner.

The frequency hopping indicates that the terminal device supports sending and/or receiving the first information in a frequency hopping manner.

In the foregoing technical solution, a plurality of manners of sending and/or receiving the first information may be predefined. For example, the manner may include {first mode, no frequency hopping}, {second mode, frequency hopping}, and {second mode, no frequency hopping}. The first configuration information may indicate one of the foregoing manners. The terminal device may obtain, by using the first configuration information, the manner of sending and/or receiving the first information, so that the terminal device sends and/or receives the first information.

In an implementation, the first configuration information indicates that a manner of sending and/or receiving the first information is one of the following: {first mode, no frequency hopping}, {second mode, frequency hopping}, {second mode, no frequency hopping}, or {first mode, frequency hopping}.

The first mode indicates that the terminal device sends and/or receives the first information based on the first capability information.

The second mode indicates that the terminal device sends and/or receives the first information based on the second capability information.

The no frequency hopping indicates that the terminal device does not support sending and/or receiving the first information in a frequency hopping manner.

The frequency hopping indicates that the terminal device supports sending and/or receiving the first information in a frequency hopping manner.

In the foregoing technical solution, a plurality of manners of sending and/or receiving the first information may be predefined. For example, the manner may include {first mode, no frequency hopping}, {second mode, frequency hopping}, {second mode, no frequency hopping}, and {first mode, frequency hopping}. The first configuration information may indicate one of the foregoing manners. The terminal device may obtain, by using the first configuration information, the manner of sending and/or receiving the first information, so that the terminal device sends and/or receives the first information.

In an implementation, the terminal device sends and/or receives the first information in a predefined sending and/or receiving manner.

The predefined sending and/or receiving manner includes at least one of the following:

when a quantity of resources occupied for sending and/or receiving the first information is greater than or equal to the second quantity, sending and/or receiving, by the terminal device, the first information in a no frequency hopping manner;

when a quantity of resources occupied for sending and/or receiving the first information is not greater than the second quantity, sending and/or receiving, by the terminal device, the first information in a frequency hopping manner, or sending and/or receiving, by the terminal device, the first information based on a frequency hopping indication;

when a quantity of resources occupied for sending and/or receiving the first information is greater than or equal to the first quantity, sending and/or receiving, by the terminal device, the first information in a carrier aggregation manner; or when a quantity of resources occupied for sending and/or receiving the first information is not greater than the first quantity, sending and/or receiving, by the terminal device, the first information in a single carrier manner.

In the foregoing technical solution, a plurality of sending and/or receiving manners may be predefined, and a trigger condition may be set in each manner. The trigger condition may be a condition that is set based on the quantity of resources occupied by the first information, the first quantity, and the second quantity. When a corresponding trigger condition is met, the terminal device sends and/or receives the first information in a predefined manner. Therefore, the terminal device may obtain, in the predefined manner, frequency hopping information and carrier aggregation information that are used to send and/or receive the first information, so that the terminal device sends and/or receives the first information.

In an implementation, the first network device is a positioning server, and the second network device is a base station; or the first network device and the second network device are a same base station.

According to a second aspect, an embodiment of this application further provides a communication method, including:

A network device receives first capability information transmitted by a terminal device, where the first capability information indicates that the terminal device supports sending and/or receiving first information by using a maximum of a first quantity of resources, and the first information includes a reference signal;

the network device receives second capability information transmitted by the terminal device, where the second capability information indicates that the terminal device supports sending and/or receiving second information by using a maximum of a second quantity of resources, and the second information includes at least one of the following: data or control information;

the network device sends first configuration information to the terminal device, where the first configuration information indicates that a quantity of resources configured for the first information is not greater than the first quantity; and the network device sends second configuration information to the terminal device, where the second configuration information indicates that a quantity of resources configured for the second information is not greater than the second quantity.

In an implementation, the first quantity is greater than the second quantity.

In an implementation, the method further includes:

the network device receives third capability information sent by the terminal device.

The third capability information indicates:

whether the terminal device supports sending and/or receiving the first information in a carrier aggregation manner; and/or the terminal device supports sending and/or receiving the first information by using a maximum of M carriers, where M is a positive integer.

In an implementation, the method further includes:

the network device receives fourth capability information sent by the terminal device.

The fourth capability information indicates:

the terminal device does not support sending and/or receiving the second information in a carrier aggregation manner; or the terminal device supports sending and/or receiving the second information by using a maximum of N carriers, where N is a positive integer.

In an implementation, the method further includes:

the network device receives fifth capability information sent by the terminal device.

The fifth capability information indicates:

the terminal device supports generating the first information according to a first algorithm;

the terminal device supports generating the first information according to a second algorithm; or the terminal device supports generating the first information according to a first algorithm and a second algorithm.

The first algorithm and the second algorithm are different algorithms.

In an implementation, the method further includes:

the network device receives sixth capability information sent by the terminal device.

The sixth capability information includes at least one type of the following information: scrambling code information, location information, period information, interval information, frequency hopping information, density information, reserved time information, tuning time information, nonsimultaneous transmit information, and nonsimultaneous receive information.

The scrambling code information includes at least one of the following: a scrambling code range and a scrambling code value set.

The location information is a location at which the first information is sent and/or received and that can be supported by the terminal device.

The period information is a period in which the first information is sent and/or received and that can be supported by the terminal device.

The interval information is an interval that is between two consecutive times of sending and/or receiving the first information and that can be supported by the terminal device.

The frequency hopping information is one or more of whether the terminal device supports sending and/or receiving the first information in a frequency hopping manner, a quantity of hops for sending and/or receiving the first information in specific time, a quantity of resource blocks RBs occupied for sending and/or receiving the first information at each hop, a resource width for sending and/or receiving the first information corresponding to each hop, a frequency hopping offset for sending and/or receiving the first information, a frequency resource range for sending and/or receiving the first information in a frequency hopping manner, and subcarrier spacing information for sending and/or receiving the first information.

The density information is a quantity of times that the terminal device sends and/or receives the first information within a specific time range.

The reserved time information is a time length that needs to be reserved before the terminal device sends and/or receives the first information, a time length that needs to be reserved after the terminal device sends and/or receives the first information, a time length that needs to be reserved between two times of sending the first information by the terminal device, or a time length that needs to be reserved between two times of receiving the first information by the terminal device.

The tuning time information is switching time between one time of sending first information by the terminal device and next time of sending first information, or switching time between one time of receiving first information by the terminal device and next time of receiving first information.

The nonsimultaneous transmit information indicates that when sending the first information, the terminal device does not support sending information other than the first information.

The nonsimultaneous receive information indicates that when receiving the first information, the terminal device does not support receiving information other than the first information.

In an implementation, the first configuration information includes:

a configuration of a manner of sending and/or receiving the first information.

The manner of sending and/or receiving the first information includes: The terminal device sends and/or receives the first information based on the first capability information, or the terminal device sends and/or receives the first information based on the second capability information; or the manner of sending and/or receiving the first information includes: The terminal device generates the first information according to the first algorithm, or generates the first information according to the second algorithm, where the first algorithm and the second algorithm are different algorithms.

In an implementation, the first configuration information includes information about sending and/or receiving the first information.

The information about sending and/or receiving the first information includes at least one of the following: scrambling code information, location information, period information, interval information, frequency hopping information, density information, guard time information, tuning time information, nonsimultaneous transmit information, and nonsimultaneous receive information.

The scrambling code information includes at least one of the following: a scrambling code range and a scrambling code value set.

The location information is a location at which the first information is sent and/or received and that can be supported by the terminal device.

The period information is a period in which the first information is sent and/or received and that can be supported by the terminal device.

The interval information is an interval that is between two consecutive times of sending and/or receiving the first information and that can be supported by the terminal device.

The frequency hopping information is one or more of whether the terminal device supports sending and/or receiving the first information in a frequency hopping manner, a quantity of hops for sending and/or receiving the first information in specific time, a quantity of resource blocks RBs occupied for sending and/or receiving the first information at each hop, a resource width for sending and/or receiving the first information corresponding to each hop, a frequency hopping offset for sending and/or receiving the first information, a frequency resource range for sending and/or receiving the first information in a frequency hopping manner, and subcarrier spacing information for sending and/or receiving the first information.

The density information is a quantity of times that the terminal device sends and/or receives the first information within a specific time range.

The reserved time information is a time length that needs to be reserved before the terminal device sends and/or receives the first information, a time length that needs to be reserved after the terminal device sends and/or receives the first information, a time length that needs to be reserved between two times of sending the first information by the terminal device, or a time length that needs to be reserved between two times of receiving the first information by the terminal device.

The tuning time information is switching time between one time of sending first information by the terminal device and next time of sending first information, or switching time between one time of receiving first information by the terminal device and next time of receiving first information.

The nonsimultaneous transmit information indicates that when sending the first information, the terminal device does not support sending information other than the first information.

The nonsimultaneous receive information indicates that when receiving the first information, the terminal device does not support receiving information other than the first information.

In an implementation, the first configuration information includes at least one of the following: whether frequency hopping is enabled, a frequency hopping time domain configuration, and a frequency hopping frequency domain configuration.

The frequency hopping time domain configuration includes at least one of the following: a start location, an interval, a period, a quantity of symbols occupied by each hop, and a frame or slot configuration.

The frequency hopping frequency domain configuration includes at least one of the following: a start RB location, a quantity of RBs occupied by each hop, a resource width corresponding to each hop, a quantity of hops on a frequency corresponding to specific time, a frequency resource range of frequency hopping, subcarrier spacing information, and a frequency hopping offset.

In an implementation, the first configuration information indicates that a manner of sending and/or receiving the first information is one of the following: {first mode, no frequency hopping}, {second mode, frequency hopping}, or {second mode, no frequency hopping}.

The first mode indicates that the terminal device sends and/or receives the first information based on the first capability information.

The second mode indicates that the terminal device sends and/or receives the first information based on the second capability information.

The no frequency hopping indicates that the terminal device does not support sending and/or receiving the first information in a frequency hopping manner.

The frequency hopping indicates that the terminal device supports sending and/or receiving the first information in a frequency hopping manner.

In an implementation, the first configuration information indicates that a manner of sending and/or receiving the first information is one of the following: {first mode, no frequency hopping}, {second mode, frequency hopping}, {second mode, no frequency hopping}, or {first mode, frequency hopping}.

The first mode indicates that the terminal device sends and/or receives the first information based on the first capability information.

The second mode indicates that the terminal device sends and/or receives the first information based on the second capability information.

The no frequency hopping indicates that the terminal device does not support sending and/or receiving the first information in a frequency hopping manner.

The frequency hopping indicates that the terminal device supports sending and/or receiving the first information in a frequency hopping manner.

In an implementation, the terminal device sends and/or receives the first information in a predefined sending and/or receiving manner.

The predefined sending and/or receiving manner includes at least one of the following:

when a quantity of resources occupied for sending and/or receiving the first information is greater than or equal to the second quantity, sending and/or receiving, by the terminal device, the first information in a no frequency hopping manner;

when a quantity of resources occupied for sending and/or receiving the first information is not greater than the second quantity, sending and/or receiving, by the terminal device, the first information in a frequency hopping manner, or sending and/or receiving, by the terminal device, the first information based on a frequency hopping indication;

when a quantity of resources occupied for sending and/or receiving the first information is greater than or equal to the first quantity, sending and/or receiving, by the terminal device, the first information in a carrier aggregation manner; or when a quantity of resources occupied for sending and/or receiving the first information is not greater than the first quantity, sending and/or receiving, by the terminal device, the first information in a single carrier manner.

According to a third aspect, an embodiment of this application further provides a communication apparatus. The communication apparatus is a terminal device. The communication apparatus includes:

a transceiver module, configured to transmit first capability information to a first network device, where the first capability information indicates that the terminal device supports sending and/or receiving first information by using a maximum of a first quantity of resources, and the first information includes a reference signal;

the transceiver module is configured to transmit second capability information to a second network device, where the second capability information indicates that the terminal device supports sending and/or receiving second information by using a maximum of a second quantity of resources, and the second information includes at least one of the following: data or control information; and a processing module, configured to obtain first configuration information, where the first configuration information indicates that a quantity of resources configured for the first information is not greater than the first quantity;

the processing module is configured to obtain second configuration information, where the second configuration information indicates that a quantity of resources configured for the second information is not greater than the second quantity.

In the third aspect of this application, the modules constituting the communication apparatus may further perform the steps described in the first aspect and the implementations of the first aspect. For details, refer to the descriptions in the first aspect and the implementations of the first aspect.

According to a fourth aspect, an embodiment of this application further provides a communication apparatus. The communication apparatus is a network device. The communication apparatus includes a processing module and a transceiver module.

The processing module is configured to receive, by using the transceiver module, first capability information transmitted by a terminal device, where the first capability information indicates that the terminal device supports sending and/or receiving first information by using a maximum of a first quantity of resources, and the first information includes a reference signal.

The processing module is configured to receive, by using the transceiver module, second capability information transmitted by the terminal device, where the second capability information indicates that the terminal device supports sending and/or receiving second information by using a maximum of a second quantity of resources, and the second information includes at least one of the following: data or control information.

The processing module is configured to send first configuration information to the terminal device by using the transceiver module, where the first configuration information indicates that a quantity of resources configured for the first information is not greater than the first quantity.

The processing module is configured to send second configuration information to the terminal device by using the transceiver module, where the second configuration information indicates that a quantity of resources configured for the second information is not greater than the second quantity.

In the fourth aspect of this application, the modules constituting the communication apparatus may further perform the steps described in the second aspect and the implementations of the second aspect. For details, refer to the descriptions in the second aspect and the implementations of the second aspect.

According to a fifth aspect, an embodiment of this application provides a communication system. The communication system includes a terminal device and a network device.

The terminal device is configured to perform the method according to any implementation of the first aspect.

The network device is configured to perform the method according to any implementation of the second aspect.

According to a sixth aspect, an embodiment of this application provides a communication system. The communication system includes a terminal device, a first network device, and a second network device.

The terminal device is configured to perform the method according to any implementation of the first aspect.

The first network device is configured to receive first capability information transmitted by the terminal device, where the first capability information indicates that the terminal device supports sending and/or receiving first information by using a maximum of a first quantity of resources, and the first information includes a reference signal.

The second network device is configured to receive second capability information transmitted by the terminal device, where the second capability information indicates that the terminal device supports sending and/or receiving second information by using a maximum of a second quantity of resources, and the second information includes at least one of the following: data or control information.

The first network device is configured to send first configuration information to the terminal device, where the first configuration information indicates that a quantity of resources configured for the first information is not greater than the first quantity.

The second network device is configured to send second configuration information to the terminal device, where the second configuration information indicates that a quantity of resources configured for the second information is not greater than the second quantity.

According to a seventh aspect, an apparatus is provided. The apparatus may be a terminal device, an apparatus in a terminal device, or an apparatus that can be used together with a terminal device. In a design, the apparatus may include modules that are in one-to-one correspondence with the method/operations/steps/actions described in the first aspect. The modules may be implemented by using a hardware circuit, software, or a combination of a hardware circuit and software. In a design, the apparatus may include a processing module and a transceiver module.

According to an eighth aspect, an apparatus is provided. The apparatus may be a network device, an apparatus in a network device, or an apparatus that can be used together with a network device. In a design, the apparatus may include modules that are in one-to-one correspondence with the method/operations/steps/actions described in the second aspect. The modules may be implemented by using a hardware circuit, software, or a combination of a hardware circuit and software. In a design, the apparatus may include a processing module and a transceiver module.

According to a ninth aspect, an embodiment of this application provides an apparatus. The apparatus includes a processor and a communication interface, and is configured to implement the method described in the first aspect. Optionally, the apparatus may further include a memory, configured to store instructions and data. The memory is coupled to the processor. When executing the instructions stored in the memory, the processor can implement the method described in the first aspect. The apparatus may further include the communication interface. The communication interface is used by the apparatus to communicate with another device. For example, the communication interface may be a transceiver, a circuit, a bus, a module, a pin, or another type of communication interface. The another device may be a network device. In a device, the apparatus includes:

the memory, configured to store program instructions; and the processor, configured to perform the steps in the first aspect through the communication interface. This is not limited herein.

According to a tenth aspect, an embodiment of this application provides an apparatus. The apparatus includes a processor and a communication interface, and is configured to implement the method described in the second aspect. Optionally, the apparatus may further include a memory, configured to store instructions and data. The memory is coupled to the processor. When executing the instructions stored in the memory, the processor can implement the method described in the second aspect. The apparatus may further include the communication interface. The communication interface is used by the apparatus to communicate with another device. For example, the communication interface may be a transceiver, a circuit, a bus, a module, a pin, or another type of communication interface. The another device may be a terminal device. In a device, the apparatus includes:

the memory, configured to store program instructions; and the processor, configured to perform the steps in the second aspect through the communication interface. This is not limited herein.

According to an eleventh aspect, an embodiment of this application further provides a computer-readable storage medium, including instructions. When the instructions are run on a computer, the computer is enabled to perform the method according to any one of the first aspect to the second aspect.

According to a twelfth aspect, an embodiment of this application further provides a computer program product, including instructions. When the instructions are run on a computer, the computer is enabled to perform the method according to any one of the first aspect to the second aspect.

According to a thirteenth aspect, an embodiment of this application provides a chip system. The chip system includes a processor and a communication interface, may further include a memory, and is configured to implement the method according to any one of the first aspect to the second aspect. The chip system may include a chip, or may include a chip and another discrete component.

According to a fourteenth aspect, an embodiment of this application provides a communication system. The communication system includes the apparatus in the first aspect and the apparatus in the second aspect.

According to the foregoing technical solutions, it can be learned that embodiments of this application have the following advantages:

DESCRIPTION OF EMBODIMENTS

Figure 1:
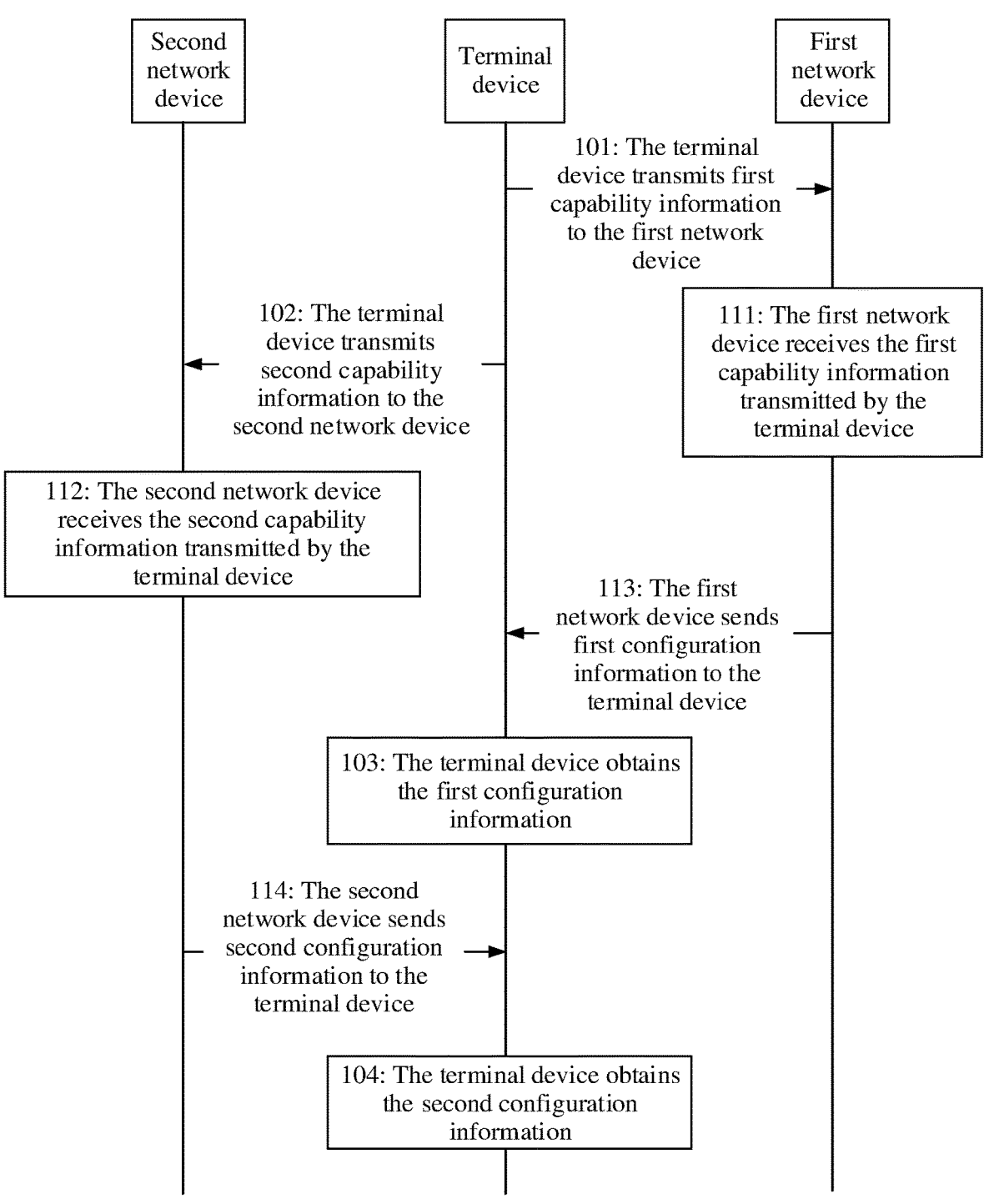
FIG. 1 is a flowchart of interaction between a terminal device and both of a first network device and a second network device according to an embodiment of this application.

Embodiments of this application provide a communication method and apparatus. A terminal device may report, by using first capability information, that the terminal device supports sending and/or receiving a reference signal by using a maximum of a first quantity of resources, and the terminal device may report, by using second capability information, that the terminal device supports sending and/or receiving second information by using a maximum of a second quantity of resources. This avoids that the terminal device sends and/or receives the second information by using the first quantity of resources, and this reduces complexity of the terminal device and reduces power consumption overheads of the terminal device.

The following describes embodiments of this application with reference to the accompanying drawings.

Technical solutions provided in embodiments of this application may be applied to various communication systems, for example, a long term evolution (LTE) system, a 5G mobile communication system, a 6G mobile communication system, a wireless fidelity (Wi-Fi) system, a future communication system, or a system integrating a plurality of communication systems. This is not limited in embodiments of this application. 5G may also be referred to as new radio (NR).

The technical solutions provided in embodiments of this application may be applied to various communication scenarios, for example, may be applied to one or more of the following communication scenarios: enhanced mobile broadband (eMBB), ultra-reliable and low-latency communication (URLLC), massive machine type communication (mMTC), device-to-device (D2D) communication, vehicle to everything (V2X) communication, vehicle to vehicle (V2V) communication, and the internet of things (IoT).

A wireless communication system includes a communication device (the communication device may also be referred to as a communication apparatus). Communication devices may perform wireless communication by using an air interface resource. The communication devices may include a network device and a terminal device, and the network device may also be referred to as a network-side device. The air interface resource may include at least one of a time domain resource, a frequency domain resource, a code resource, and a spatial resource. In embodiments of this application, "at least one" may also be described as "one or more", and "a plurality of" may be "two, three, four, or more". This is not limited in this application. For example, the wireless communication system includes two communication devices: a network device and a terminal device. Alternatively, the wireless communication system provided in embodiments of this application may include three communication devices: a first network device, a second network device, and a terminal device.

In embodiments of this application, "/" may represent an "or" relationship between associated objects. For example, A/B may represent A or B. "And/or" may be used to indicate that there are three relationships between associated objects. For example, A and/or B may represent the following three cases: Only A exists, both A and B exist, and only B exists. A and B may be singular or plural. To facilitate description of the technical solutions in embodiments of this application, in embodiments of this application, words such as "first", "second", "A", and "B" may be used to distinguish between technical features with a same or similar function. The words such as "first", "second", "A", and "B" do not limit a quantity and an execution sequence, and the words such as "first", "second", "A", and "B" do not indicate a definite difference either. In embodiments of this application, the word such as "example" or "for example" is used to represent an example, an illustration, or a description, and is described as "example" or "for example". Any embodiment or design scheme should not be explained as being more preferred or having more advantages than another embodiment or design scheme. Use of the terms such as "example" or "for example" is intended to present a related concept in a specific manner for ease of understanding.

The terminal device in embodiments of this application may also be referred to as a terminal, and may be a device having a wireless transceiver function. The terminal device may be deployed on land, including an indoor device, an outdoor device, a handheld device, or a vehicle-mounted device; may be deployed on the surface of water (such as in a steamship); or may be deployed in the air (such as on an airplane, a balloon, or a satellite). The terminal device may be user equipment (UE). The UE includes a handheld device, a vehicle-mounted device, a wearable device, or a computing device having a wireless communication function. For example, the UE may be a mobile phone, a tablet computer, or a computer having a wireless transceiver function. Alternatively, the terminal device may be a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in a smart city, a wireless terminal in a smart home, or the like. In embodiments of this application, an apparatus configured to implement a function of the terminal device may be a terminal device, or may be an apparatus, for example, a chip system, that can support a terminal device in implementing the function. The apparatus may be deployed on the terminal device, or may be used together with the terminal device. In this embodiment of this application, the chip system may include a chip, or may include a chip and another discrete component. In embodiments of this application, an example in which the apparatus configured to implement the function of the terminal device is a terminal device is used to describe the technical solutions provided in embodiments of this application.

A terminal device in an mMTC scenario may be a reduced capability (REDCAP) terminal device. The REDCAP terminal device may also be referred to as a light terminal device. For example, a REDCAP terminal device in an NR system has a capability lower than that of a conventional terminal device. For example, compared with the conventional terminal device, the REDCAP terminal device has one or more of the following features: a narrower supported bandwidth, a smaller quantity of configured antennas, smaller maximum supported transmit power, a lower supported duplex capability (for example, the conventional terminal device supports full-duplex frequency division duplex, and the REDCAP terminal device supports half-duplex frequency division duplex), and a weaker data processing capability (for example, the REDCAP terminal device can process less data than the conventional terminal device within a same period, or the REDCAP terminal device takes a longer period to process same data than the conventional terminal device). Therefore, the REDCAP terminal device and the conventional terminal device may require different system information, dedicated access networks, control channels with different performance, and/or the like. The conventional terminal device may be a non-REDCAP terminal device, and the non-REDCAP terminal device mainly supports an eMBB service and/or a URLLC service. Compared with the REDCAP terminal device, the conventional terminal device may be considered as a high-capability terminal device or a terminal device whose capability is not limited. Optionally, the conventional terminal device may be replaced with a terminal device that is introduced in the future and that has a high capability compared with the REDCAP terminal device.

It should be noted that the mMTC user equipment in this embodiment of this application may include an RADCAP terminal device. For example, the mMTC user equipment may be low-complexity user equipment, narrow-bandwidth user equipment, an internet of things device, or a low-end intelligent handheld terminal. A maximum bandwidth supported by the mMTC user equipment is less than 100 MHz. It should be noted that the mMTC user equipment in embodiments of this application is a machine type communication device, or may be a smart handheld terminal.

The network device in embodiments of this application may be a base station (BS), and may be a device deployed in a radio access network for wireless communication with a terminal device. The base station may be in a plurality of forms, such as a macro base station, a micro base station, a relay station, and an access point. For example, the base station in embodiments of this application may be a base station in a 5G mobile communication system or a base station in an LTE system. The base station in the 5G mobile communication system may also be referred to as a transmission reception point (TRP) or a gNB. In embodiments of this application, an apparatus configured to implement a function of the network device may be a network device, or may be an apparatus, for example, a chip system, that can support a network device in implementing the function. The apparatus may be deployed on the network device, or may be used together with the network device. In embodiments of this application, an example in which the apparatus configured to implement the function of the network device is a network device is used to describe the technical solutions provided in embodiments of this application.

The network device in embodiments of this application may be a positioning server. The positioning server is a network unit that can position the terminal device. For example, the positioning server provides a location service for the terminal device based on location capability information of the terminal device. For example, the positioning server may be a location management function (LMF) or another function entity that provides a positioning service.

The technical solutions provided in embodiments of this application may be applied to wireless communication between communication devices. The wireless communication between communication devices may include wireless communication between the network device and the terminal device, wireless communication between network devices, and wireless communication between terminal devices. In embodiments of this application, the term "wireless communication" may be referred to as "communication" for short, and the term "communication" may also be described as "data transmission", "information transmission", or "transmission". The technical solution may be used for wireless communication between a scheduling entity and a subordinate entity. The scheduling entity may allocate a resource to the subordinate entity. A person skilled in the art may use the technical solutions provided in embodiments of this application to perform wireless communication between another scheduling entity and a subordinate entity, for example, wireless communication between a macro base station and a micro base station.

An embodiment of this application provides a communication method. The method is applicable to a communication scenario between a terminal device and at least one network device, and may provide a proper resource for a positioning service of different types of terminal devices. For example, a resource applicable to a positioning service of a REDCAP terminal device may be provided for the REDCAP terminal device, to meet communication requirements of various types of terminal devices. For example, the REDCAP terminal device and a conventional terminal device support different bandwidths, or the REDCAP terminal device and a conventional terminal device support different aggregation levels (ALs), or the REDCAP terminal device and a conventional terminal device support different quantities of candidate control channels. In this embodiment of this application, the terminal device transmits first capability information to a first network device, where the first capability information indicates that the terminal device supports sending and/or receiving first information by using a maximum of a first quantity of resources, and the first information includes a reference signal. The terminal device transmits second capability information to a second network device, where the second capability information indicates that the terminal device supports sending and/or receiving second information by using a maximum of a second quantity of resources, and the second information includes at least one of the following: data or control information. The terminal device obtains first configuration information, where the first configuration information indicates that a quantity of resources configured for the first information is not greater than the first quantity. The terminal device obtains second configuration information, where the second configuration information indicates that a quantity of resources configured for the second information is not greater than the second quantity. In this embodiment of this application, the terminal device may report, by using the first capability information, that the terminal device supports sending and/or receiving the reference signal by using a maximum of the first quantity of resources, and the terminal device may report, by using the second capability information, that the terminal device supports sending and/or receiving the second information by using a maximum of the second quantity of resources. This avoids that the terminal device sends and/or receives the second information by using the first quantity of resources, and this reduces complexity of the terminal device and reduces power consumption overheads of the terminal device.

In this embodiment of this application, transfer may be understood as transfer or reporting. Sending means that the terminal device sends information to the network device, for example, sending the reference signal, sending the data, or sending the control information. The data herein may be data carried on a physical shared channel, and the reference signal does not belong to the data.

This embodiment of this application relates to communication between the terminal device and the at least one network device. For example, the terminal device may communicate with a network device. For example, the network device may be a base station or another communication entity that provides a positioning service and a communication service for the terminal device. In this embodiment of this application, the terminal device may report a plurality of pieces of capability information to the network device. In this embodiment of this application, the terminal device transmits the first capability information to the network device, where the first capability information indicates that the terminal device supports sending and/or receiving the first information by using a maximum of the first quantity of resources, and the first information includes the reference signal. The terminal device transmits the second capability information to the network device, where the second capability information indicates that the terminal device supports sending and/or receiving the second information by using a maximum of the second quantity of resources, and the second information includes at least one of the following: the data or the control information. In this embodiment of this application, the terminal device may report, by using the first capability information, that the terminal device supports sending and/or receiving the reference signal by using a maximum of the first quantity of resources, and the terminal device may report, by using the second capability information, that the terminal device supports sending and/or receiving the second information by using a maximum of the second quantity of resources. This avoids that the terminal device sends and/or receives the second information by using the first quantity of resources, and this reduces complexity of the terminal device and reduces power consumption overheads of the terminal device.

This embodiment of this application relates to communication between the terminal device and the at least one network device. For example, the terminal device may communicate with two network devices. For example, the terminal device separately communicates with the first network device and the second network device. The first network device and the second network device are two different network devices. For example, the first network device is a positioning server, and the positioning server may provide a positioning service for the terminal device. The second network device may be a base station, and the base station may provide a communication service for the terminal device. In this embodiment of this application, the first network device and the second network device may alternatively be a same network device. For example, the network device may be a base station. In a subsequent embodiment, an example in which the terminal device separately communicates with the first network device and the second network device is used for description.

This embodiment of this application relates to sending and/or receiving of the first information and sending and/or receiving of the second information. A plurality of application scenarios are involved. For example, the terminal device sends the first information and the second information. For example, the terminal device sends the first information and receives the second information. For example, the terminal device receives the first information and sends the second information. For example, the terminal device receives the first information and receives the second information. In this embodiment of this application, sending and/or receiving of the first information and sending and/or receiving of the second information are not limited. In a subsequent embodiment, sending of the first information and sending of the second information are used as an example for description.

FIG. 1 is a flowchart of interaction between network devices and a terminal device according to an embodiment of this application. In the interaction procedure, step 101 to step 104 are described from a side of the terminal device, step 111 and step 113 are described from a side of a first network device, and step 112 and step 114 are described from a side of a second network device. The interaction procedure shown in FIG. 1 mainly includes the following steps.

101: The terminal device transmits first capability information to the first network device, where the first capability information indicates that the terminal device supports sending and/or receiving first information by using a maximum of a first quantity of resources, and the first information includes a reference signal.

In this embodiment of this application, the terminal device sends and/or receives information by using a resource. The terminal device requests the network device to allocate a resource. The terminal device reports the capability information of the terminal device. The network device allocates the resource to the terminal device based on the capability information of the terminal device.

The terminal device sends and/or receives the first information by using a resource. The terminal device requests the network device to allocate a resource. The terminal device reports the first capability information of the terminal device to the first network device. The first capability information indicates that the terminal device supports sending and/or receiving the first information by using a maximum of the first quantity of resources, and the first information includes the reference signal. In this embodiment of this application, the reference signal may be an uplink reference signal. For example, the uplink reference signal may be a sounding reference signal (SRS). For another example, the reference signal may alternatively be a downlink reference signal. For example, the downlink reference signal may be a positioning reference signal (PRS). It should be noted that, in addition to the reference signal, the first information may further include other types of information. For example, the first information may be a control signal applicable to a specific scenario.

The terminal device generates the first capability information, where the first capability information indicates that the terminal device supports sending and/or receiving the first information by using a maximum of the first quantity of resources. The maximum of the first quantity of resources supported by the terminal device is a maximum quantity of resources supported by the terminal device for sending and/or receiving the first information. For example, the maximum quantity of resources supported by the terminal device is the first quantity. In other words, a maximum capability of the terminal device is to send and/or receive the first information by using the first quantity of resources, and the terminal device cannot send and/or receive the first information by using more than the first quantity of resources.

It should be noted that, in some implementations of this embodiment of this application, the quantity in this embodiment of this application may be understood as a number or an amount. In this case, the first quantity of resources is a first number of resources. For example, when the resource is a resource block (RB), the first quantity of resources is a first number of resource blocks. For example, when a subcarrier spacing is 120 kHz (for example, a frequency range FR2), the first quantity of bandwidth is 66 resource blocks (or 132 resource blocks, or 264 resource blocks).

It should be noted that, in some other implementations of this embodiment of this application, the quantity in this embodiment of this application may alternatively be understood as a size. In this case, the first quantity of resources is a first size of resources. For example, when the resource is a bandwidth, the first quantity of resources is a first size of bandwidth. For example, the first quantity of bandwidth is 100 MHz, 200 MHz, or 300 MHz.

111: The first network device receives the first capability information transmitted by the terminal device, where the first capability information indicates that the terminal device supports sending and/or receiving the first information by using a maximum of the first quantity of resources, and the first information includes the reference signal.

The terminal device establishes a communication connection to the first network device. The terminal device sends the first capability information to the first network device. In this case, the first network device receives the first capability information transmitted by the terminal device. The first network device parses the first capability information. The first capability information indicates that the terminal device supports sending and/or receiving the first information by using a maximum of the first quantity of resources, so that the first network device can obtain a maximum resource that can be used by the terminal device to send and/or receive the first information.

Optionally, in this embodiment of this application, the first information includes the reference signal. For example, the reference signal is an uplink reference signal. For example, the uplink reference signal is a sounding reference signal (SRS), or an uplink positioning sounding reference signal (pos-SRS). For example, the reference signal is a downlink reference signal. For example, the downlink reference signal is a downlink positioning reference signal (PRS), a channel state information reference signal (CSI-RS), or a synchronization signal and physical broadcast channel block (synchronization signal and PBCH (physical Broadcast Channel) Block, SSB). The positioning sounding reference signal pos-SRS or the sounding reference signal SRS is used by a peer device (communicating with the terminal device) to position the terminal device. The sounding reference signal SRS may further be used by a peer device that performs communication to perform channel measurement.

102: The terminal device transmits second capability information to the second network device, where the second capability information indicates that the terminal device supports sending and/or receiving second information by using a maximum of a second quantity of resources, and the second information includes at least one of the following: data or control information.

The terminal device sends and/or receives information by using a resource. The terminal device requests the network device to allocate a resource. The terminal device reports capability information of the terminal device. The network device allocates the resource to the terminal device based on the capability information of the terminal device.

The terminal device sends and/or receives the second information by using a resource. The terminal device requests the network device to allocate a resource. The terminal device reports the second capability information of the terminal device to the second network device. The second capability information indicates that the terminal device supports sending and/or receiving the second information by using a maximum of the second quantity of resources. The second information includes at least one of the following: the data or the control information. The data may be data carried on a physical shared channel. The control information may be control information carried on a physical control channel.

Optionally, in this embodiment of this application, the second information includes at least one type of the following: the data or the control information. For example, the second information is data carried on the physical shared channel. The physical shared channel may be a physical uplink shared channel and/or a physical downlink shared channel. The control information may be information carried on the physical control channel. The physical control channel may be a physical uplink control channel and/or a physical downlink control channel. Further, in some implementations of this embodiment of this application, the second information may further include a sounding reference signal.

For example, the first information is a positioning sounding reference signal, and the second information is data. For example, the first information is a positioning sounding reference signal, and the second information is data or a sounding reference signal.

In some embodiments of this application, the second information does not include the reference signal. In this embodiment of this application, for different types of information, the terminal device separately reports capability information corresponding to the information. The terminal device may be classified into two types based on whether the information is the reference signal. For example, the first information includes the reference signal, and the second information does not include the reference signal. In this case, the terminal device may separately report, for the first information and the second information, the first capability information corresponding to the first information and the second capability information corresponding to the second information.

In addition, it should be noted that the reference signal is different from the data, and the reference signal is different from the control information.

It should be noted that a sequence of step 101 and step 102 is not limited in this application. In addition, generation of the first capability information does not depend on generation of the second capability information. Similarly, generation of the second capability information does not depend on generation of the first capability information. For example description, in FIG. 1, an example in which step 101 is first performed and then step 102 is performed is used for description, but this is not intended to limit this embodiment of this application.

It should be noted that, in some implementations of this embodiment of this application, the quantity in this embodiment of this application may be understood as a number or an amount. In this case, the first quantity of resources is a first number of resources, and the second quantity of resources is a second number of resources. For example, when the resource is a resource block, the first quantity of resources is a first number of resource blocks, and the second quantity of resources is a second number of resource blocks. For example, when the subcarrier spacing is 30 kHz (a frequency range FR1), the second quantity of bandwidth is 51 resource blocks (or 106 resource blocks, or 11 resource blocks). For example, when a subcarrier spacing is 120 kHz (a frequency range FR2), the first quantity of bandwidth is 66 resource blocks (or 132 resource blocks, or 264 resource blocks).

It should be noted that, in some implementations of this embodiment of this application, the quantity in this embodiment of this application may alternatively be understood as a size. In this case, the first quantity of resources is a first size of resources, and the second quantity of resources is a second size of resources. For example, when the resource is a bandwidth, the first quantity of resources is a first size of bandwidth, and the second quantity of resources is a second size of bandwidth. For example, the second quantity of bandwidth is 20 MHz, 40 MHz, or 5 MHz. For example, the first quantity of bandwidth is 100 MHz, 200 MHz, or 300 MHz.

The following describes the first capability information and the second capability information. The first capability information indicates that the terminal device supports sending the first information by using a maximum of the first quantity of resources. In other words, the first capability information indicates the first quantity, and the first quantity of resources is a maximum bandwidth supported by the terminal device for sending the first information.

The second capability information indicates that the terminal device supports sending the second information by using a maximum of the second quantity of resources. In other words, the second capability information indicates the second quantity, and the second quantity of resources is a maximum bandwidth supported by the terminal device (for sending the second information).

112: The second network device receives the second capability information transmitted by the terminal device, where the second capability information indicates that the terminal device supports sending and/or receiving the second information by using a maximum of the second quantity of resources, and the second information includes at least one of the following: the data or the control information.

A communication connection is established between the terminal device and the second network device, and the terminal device sends the second capability information to the second network device. In this case, the second network device receives the second capability information transmitted by the terminal device, and the second network device parses the second capability information. The second capability information indicates that the terminal device supports sending and/or receiving the second information by using a maximum of the second quantity of resources, so that the second network device can obtain a maximum resource that can be used by the terminal device to send and/or receive the second information.

It should be noted that a sequence of step 111 and step 112 is not limited in this application.

113: The first network device sends first configuration information to the terminal device, where optionally, the first configuration information indicates that a quantity of resources configured for the first information is not greater than the first quantity.

In this embodiment of this application, the first network device may determine the first configuration information based on the first information. The first network device performs the foregoing step 111. The first network device obtains the first capability information transmitted by the terminal device, and the first network device parses the first capability information. The first capability information indicates that the terminal device supports sending and/or receiving the first information by using a maximum of the first quantity of resources, so that the first network device can obtain a maximum resource that can be used by the terminal device to send and/or receive the first information. The first network device may configure a resource for the first information. For example, the first network device configures a resource used by the terminal device to send and/or receive the first information. The first network device generates the first configuration information. The first configuration information indicates that a quantity of resources configured for the first information is not greater than the first quantity. The first quantity is obtained by the first network device by parsing the first capability information, or is obtained based on an indication of the first capability information.

For example, the first configuration information may be included in one or more of radio resource control (RRC), medium access control (MAC) signaling, and downlink control information (DCI), or the first configuration information may be included in signaling sent by a positioning service device to the terminal device. For example, the positioning service device is the first network device.

It should be specially noted that, in some implementations of this embodiment of this application, the first configuration information indicates a manner of sending and/or receiving the first information. The manner of the first information: The first information is sent and/or received based on the bandwidth (namely, the second quantity of bandwidth) of the terminal device. Alternatively, the manner of the first information: The first information is sent and/or received based on the first quantity of bandwidth.

The sending and/or receiving the first information based on the bandwidth of the terminal device may be understood as sending and/or receiving, by the terminal device, the first information based on a mechanism specified for a first-type terminal device according to a standard. A bandwidth of the first-type terminal device is equal to the second quantity of bandwidth. For example, the first-type terminal device may be a reduced capability device. For example, the second quantity of bandwidth may be 5 MHz or 20 MHz.

The sending and/or receiving the first information based on the first quantity of bandwidth may be understood as sending and/or receiving, by the terminal device, the first information based on a mechanism specified for a second-type terminal device according to a standard. A bandwidth of the second-type terminal device is greater than the bandwidth of the first-type terminal device. For example, the second-type terminal device may be an enhanced mobile broadband device. For example, the first quantity of bandwidth may be 5 MHz, 20 MHz, 40 MHz, or 100 MHz.

In some embodiments of this application, the first configuration information configured by the first network device does not exceed the first capability information reported by the terminal device. For example, a bandwidth of the positioning sounding reference signal reported by the terminal device is 100 MHz, and a transmission bandwidth of the positioning sounding reference signal configured by the first network device does not exceed 100 MHz. For example, the transmission bandwidth of the positioning sounding reference signal configured by the first network device is 20 MHz, 40 MHz, 80 MHz, or 100 MHz.

103: The terminal device obtains the first configuration information, where optionally, the first configuration information indicates that the quantity of resources configured for the first information is not greater than the first quantity.

In this embodiment of this application, after the terminal device reports the first capability information, the terminal device may obtain the first configuration information, where the first configuration information indicates a resource configuration for sending and/or receiving the first information. The first configuration information includes a resource indication configured for the first information. For example, if the first configuration information indicates the quantity of resources configured for the first information, the quantity of resources configured for the first information is not greater than the first quantity. In other words, the terminal device learns that the quantity of resources configured for the first information is not greater than the first quantity.

For example, the terminal device may obtain the first configuration information from the first network device, so that the terminal device may learn that the quantity of resources configured for the first information is not greater than the first quantity.

114: The second network device sends second configuration information to the terminal device, where optionally, the second configuration information indicates that a quantity of resources configured for the second information is not greater than the second quantity.

In this embodiment of this application, the second network device may determine the second configuration information based on the second information. The second network device performs the foregoing step 112. The second network device obtains the second capability information transmitted by the terminal device. The second network device parses the second capability information. The second capability information indicates that the terminal device supports sending and/or receiving the second information by using a maximum of the second quantity of resources, so that the second network device can obtain a maximum resource that can be used by the terminal device to send and/or receive the second information. The second network device may configure a resource for the second information. For example, the second network device configures a resource used by the terminal device to send and/or receive the second information. The second network device generates the second configuration information. The second configuration information indicates that the quantity of resources configured for the second information is not greater than the second quantity. The second quantity is obtained by the second network device by parsing the second capability information, or is obtained based on an indication of the second capability information.

For example, the second configuration information may be one or more of RRC signaling, MAC signaling, and DCI, or the second configuration information may be included in signaling sent by the positioning service device to the terminal device. For example, the positioning service device is the second network device. The configuration in this embodiment of this application may also be understood as allocation or scheduling.

104: The terminal device obtains the second configuration information, where optionally, the second configuration information indicates that the quantity of resources configured for the second information is not greater than the second quantity.

In this embodiment of this application, after the terminal device reports the second capability information, the terminal device may obtain the second configuration information, where the second configuration information indicates a resource configuration for sending and/or receiving the second information. The second configuration information includes a resource indication configured for the second information. For example, if the second configuration information indicates the quantity of resources configured for the second information, the quantity of resources configured for the second information is not greater than the second quantity. In other words, the terminal device learns that the quantity of resources configured for the second information is not greater than the second quantity.

It should be noted that a sequence of 103 and 104 is not limited, and a sequence of 113 and 114 is not limited.

For example, the terminal device may obtain the second configuration information from the second network device, so that the terminal device may learn that the quantity of resources configured for the second information is not greater than the second quantity.

In some embodiments of this application, the first quantity is greater than the second quantity.

The first quantity is a quantity of resources indicated in the first capability information, and the second quantity is a quantity of resources indicated in the second capability information. The first capability information is used to request a resource corresponding to the first information (for example, the first information is the reference signal), and the second capability information is used to request a resource corresponding to the second information (for example, the second information is the data or the control information). In this case, the first quantity is greater than the second quantity. In other words, the terminal device may request a large quantity of resources for sending the reference signal, and request a small quantity of resources for sending the data. Therefore, a high-precision positioning requirement of the terminal device (for example, RedCap UE) may be implemented without greatly increasing complexity/costs/power consumption of the UE.

In this embodiment of this application, increasing the radio frequency bandwidth does not significantly increase costs of the UE, but costs of the UE significantly increase with a bandwidth capability (namely, a baseband bandwidth) of data transmission (hereinafter briefly referred to as data transmission) of the UE. Therefore, in this embodiment of this application, positioning performance is improved, and a significant increase in complexity/costs of the UE is effectively avoided.

In some embodiments of this application, the first quantity belongs to a first quantity set, and at least one quantity in the first quantity set is greater than the second quantity;

the first quantity belongs to a first quantity set, the second quantity is predefined, and at least one quantity in the first quantity set is greater than the second quantity;

the first quantity belongs to a first quantity set, the second quantity belongs to a second quantity set, and at least one quantity in the first quantity set is greater than the second quantity;

the first quantity belongs to a first quantity set, the second quantity belongs to a second quantity set, and at least one quantity in the first quantity set is greater than all quantities in the second quantity set;

the first quantity is predefined, the second quantity is predefined, and the first quantity is greater than the second quantity; or the first quantity is predefined, the second quantity is predefined, and the first quantity is not greater than the second quantity.

However, the first quantity and the second quantity are separately determined by the terminal device. For example, the first quantity belongs to the first quantity set, and at least one quantity in the first quantity set is greater than the second quantity. An implementation of the first quantity set is not limited in this embodiment of this application. For example, the first quantity set may include one component element, or include a plurality of component elements, where the component element is a quantity that constitutes the first quantity set. At least one quantity in the first quantity set is greater than the second quantity. Therefore, the first quantity may be greater than the second quantity. A value of the first quantity is not limited herein.

For example, the first quantity belongs to the first quantity set, the second quantity is predefined, at least one quantity in the first quantity set is greater than the second quantity, and the second quantity is predefined by the terminal device.

For example, the terminal device predefines that a bandwidth of the second quantity is 20 MHz, 40 MHz, or 5 MHz, or predefines that a bandwidth of the second quantity is 51 resource blocks (or 106 resource blocks, or 11 resource blocks). The first quantity set may include one component element, or include a plurality of component elements, where the component element is a quantity that constitutes the first quantity set. At least one quantity in the first quantity set is greater than the second quantity. Therefore, the first quantity may be greater than the second quantity. A value of the first quantity is not limited herein.

For example, the first quantity belongs to the first quantity set, the second quantity belongs to the second quantity set, and at least one quantity in the first quantity set is greater than the second quantity. In this embodiment of this application, implementations of the first quantity set and the second quantity set are not limited. For example, the first quantity set may include one component element, or include a plurality of component elements, where the component element is a quantity that constitutes the first quantity set. The second quantity set may include one component element, or include a plurality of component elements, where the component element is a quantity that constitutes the second quantity set. At least one quantity in the first quantity set is greater than the second quantity. Therefore, the first quantity may be greater than the second quantity. A value of the first quantity is not limited herein.

For example, the first quantity belongs to the first quantity set, the second quantity belongs to the second quantity set, and at least one quantity in the first quantity set is greater than all quantities in the second quantity set. In this embodiment of this application, implementations of the first quantity set and the second quantity set are not limited. For example, the first quantity set may include one component element, or include a plurality of component elements, where the component element is a quantity that constitutes the first quantity set. The second quantity set may include one component element, or include a plurality of component elements, where the component element is a quantity that constitutes the second quantity set. At least one quantity in the first quantity set is greater than all the quantities in the second quantity set. Therefore, the first quantity may be greater than the second quantity. A value of the first quantity is not limited herein.

For example, the first quantity is predefined, the second quantity is predefined, and the first quantity is greater than the second quantity.

For example, the first quantity is predefined, the second quantity is predefined, and the first quantity is not greater than the second quantity.

In this embodiment of this application, values of the first quantity and the second quantity may be predefined. The terminal device may indicate, by using the first capability information, whether the first quantity takes effect. In addition, the terminal device may indicate, by using the second capability information, whether the second quantity takes effect. It should be noted that the terminal device may separately configure the first capability information and the second capability information. When the first quantity is greater than the second quantity, a high-precision positioning requirement of the terminal device (for example, Red-Cap UE) may be implemented without greatly increasing complexity/costs/power consumption of the UE. When the first quantity is not greater than the second quantity, a transmission bandwidth capability of a positioning reference signal may be less than a bandwidth capability of data transmission, and the positioning reference signal may not be sent on a full bandwidth. This can effectively reduce power consumption of the UE.

In some embodiments of this application, the resource is one or more of a bandwidth, a resource block, a carrier, a subband, a frequency range, a frequency segment, a frequency band, a subcarrier spacing, a bandwidth part (BWP), a frequency hopping interval, and a quantity of frequency hops within a specific time range. A resource defined in this embodiment of this application has a plurality of implementations. For example, the resource may be a bandwidth, or the resource may be a resource block. This is not limited in this embodiment of this application. Related concepts of a bandwidth, a resource block, a carrier, a subband, a frequency range, a frequency segment, a frequency band, a subcarrier spacing, a BWP, a frequency hopping interval, and a quantity of frequency hops within a specific time range are not described herein again.

In some embodiments of this application, optionally, in addition to the foregoing steps, the communication method provided in this embodiment of this application further includes the following steps.

A1: The terminal device sends third capability information to the first network device or the second network device.

A2: The first network device or the second network device receives the third capability information sent by the terminal device.

The third capability information indicates:

whether the terminal device supports sending and/or receiving the first information in a carrier aggregation manner; and/or the terminal device supports sending and/or receiving the first information by using a maximum of M carriers, where M is a positive integer.

The third capability information may be sent by the terminal device by using RRC signaling. The third capability information and the first capability information may be sent in a same piece of signaling, or the third capability information and the first capability information may be separately sent by using different pieces of signaling. This is not limited herein. In addition, the third capability information and the second capability information may be sent in a same piece of signaling, or the third capability information and the second capability information may be separately sent by using different pieces of signaling. This is not limited herein. An implementation of the third capability information depends on an application scenario, and is not limited herein.

In this embodiment of this application, the third capability information indicates whether the terminal device supports sending and/or receiving the first information in the carrier aggregation manner. For example, the third capability information may be 1-bit indication information, and the indication information indicates whether the terminal device supports sending and/or receiving the first information in the carrier aggregation manner. In addition, the third capability information indicates that the terminal device supports sending and/or receiving the first information by using a maximum of the M carriers, where M is a positive integer. For example, a value of M may be carried in the third capability information. That the terminal device sends and/or receives the first information by using a maximum of the M carriers means that a maximum of carriers used by the terminal device can be the M carriers. The terminal device sends the third capability information, so that the first network device or the second network device may determine whether the terminal device uses carrier aggregation and determine a quantity of carriers used for aggregation.

The following describes carrier aggregation. In some implementations of this embodiment of this application, the terminal device may send the first information on a larger frequency resource through frequency hopping, carrier switching, carrier aggregation, joint frequency hopping and carrier switching, or joint frequency hopping and carrier aggregation. For example, the terminal device can send a positioning reference signal on a resource corresponding to a single carrier of a maximum of 100 MHz, to implement higher-precision positioning.

Figure 2A:
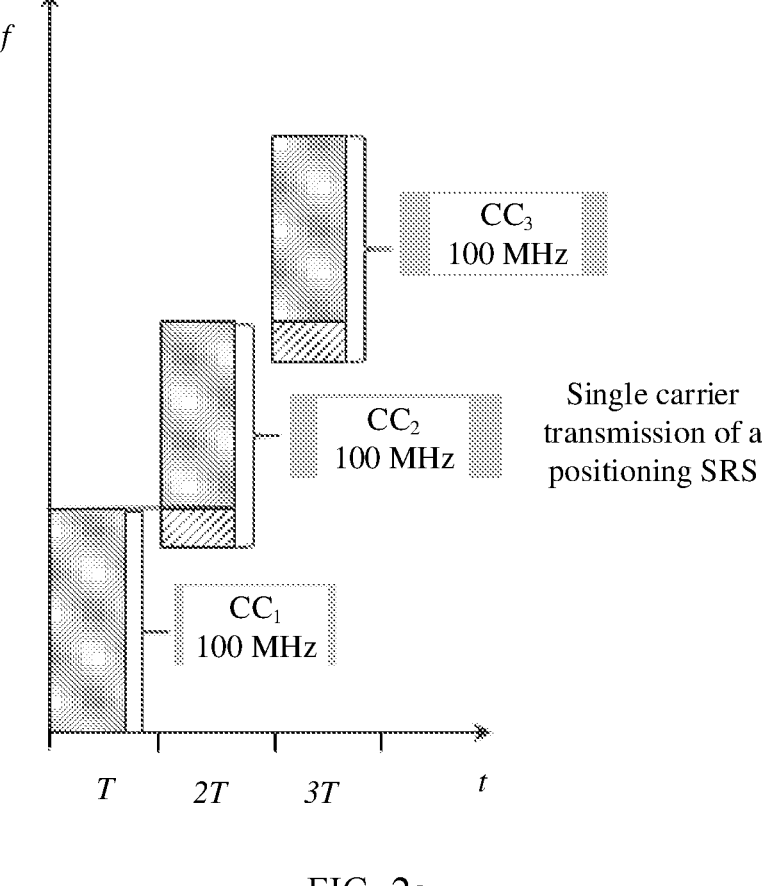
FIG. 2*a* is a diagram of a carrier aggregation application scenario according to an embodiment of this application.
Figure 2B:
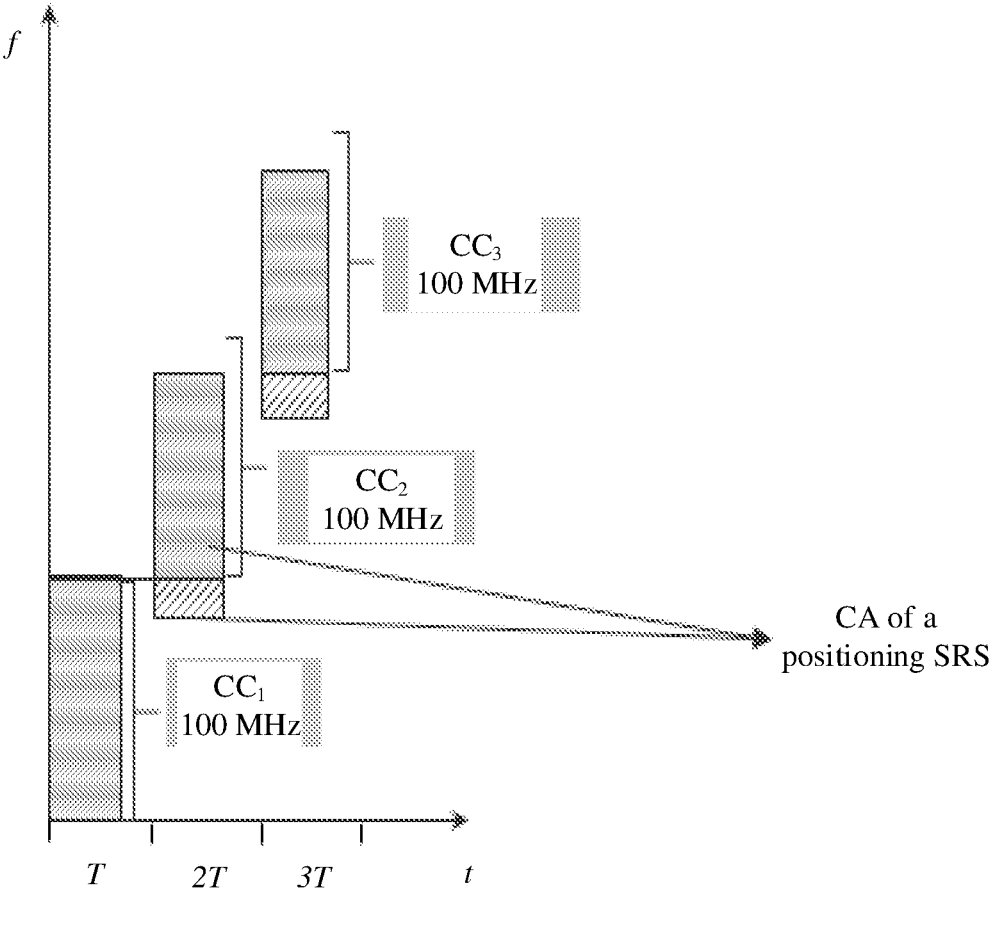
FIG. 2*b* is a diagram of a carrier aggregation application scenario according to an embodiment of this application.

For example, if different carriers overlap, the terminal device may send a positioning sounding reference signal on a larger frequency resource through carrier (CC) switching. According to such a method, the terminal device does not need to be capable of sending the positioning sounding reference signal in a carrier aggregation manner. This reduces complexity of UE. As shown in FIG. 2$a$, it is assumed that there are three carriers: $CC_1$, $CC_2$, and $CC_3$, where each carrier is 100 MHz, and different carriers overlap. According to a joint frequency hopping and carrier switching method, the UE may send the positioning sounding reference signal on a frequency resource of nearly 300 MHz, to maintain low complexity of the terminal device. In other words, the UE does not need to have a capability of sending the positioning sounding reference signal in a carrier aggregation manner, and can further implement higher-precision positioning.

For another example, if different carriers do not overlap, the terminal device may send the positioning sounding reference signal on a larger frequency resource through joint frequency hopping and carrier aggregation. As shown in FIG. 2$b$, it is assumed that there are three carriers: $CC_1$, $CC_2$, and $CC_3$. $CC_2$ overlaps $CC_1$ and $CC_3$. It is assumed that each carrier is 100 MHz, and different carriers do not overlap. Therefore, carrier aggregation needs to be performed. For example, the UE may send the positioning sounding reference signal on the frequency resource of nearly 300 MHz according to the joint frequency hopping and carrier aggregation method, to implement higher-precision positioning.

In some embodiments of this application, optionally, in addition to the foregoing steps, the communication method provided in this embodiment of this application further includes the following steps.

B1: The terminal device sends fourth capability information to the first network device or the second network device.

B2: The first network device or the second network device receives the fourth capability information sent by the terminal device.

The fourth capability information indicates:

the terminal device does not support sending and/or receiving the second information in a carrier aggregation manner; or the terminal device supports sending and/or receiving the second information by using a maximum of N carriers, where N is a positive integer.

The fourth capability information may be sent by the terminal device by using RRC signaling. The fourth capability information and the first capability information may be sent in a same piece of signaling, or the fourth capability information and the first capability information may be separately sent by using different pieces of signaling. This is not limited herein. In addition, the fourth capability information and the second capability information may be sent in a same piece of signaling, or the fourth capability information and the second capability information may be separately sent by using different pieces of signaling. This is not limited herein. An implementation of the fourth capability information depends on an application scenario, and is not limited herein.

In this embodiment of this application, the fourth capability information indicates whether the terminal device supports sending and/or receiving the second information in the carrier aggregation manner. For example, the fourth capability information may be 1-bit indication information, and the indication information indicates that the terminal device does not support sending and/or receiving the second information in the carrier aggregation manner. In addition, the fourth capability information indicates that the terminal device supports sending and/or receiving the second information by using a maximum of the N carriers, where N is a positive integer. For example, a value of N may be carried in the fourth capability information. That the terminal device sends and/or receives the second information by using a maximum of the N carriers means that a maximum of carriers used by the terminal device can be the N carriers. The terminal device sends the fourth capability information, so that the first network device or the second network device may determine that the terminal device does not use carrier aggregation and determine a quantity of carriers used for aggregation.

Further, in some embodiments of this application, N is less than M; or

N is not greater than M.

When N is less than M, a high-precision positioning requirement of the terminal device (for example, RedCap UE) may be implemented without greatly increasing complexity/costs/power consumption of the UE. That N is not greater than M means that N is less than M, or N=M. When N is less than M, a high-precision positioning requirement of the terminal device (for example, RedCap UE) may be implemented without greatly increasing complexity/costs/power consumption of the UE. When N=M, a transmission bandwidth capability of a positioning reference signal is equal to a bandwidth capability of data transmission. This simplifies a configuration manner of a transmission bandwidth of the positioning reference signal and a bandwidth of data transmission.

In some embodiments of this application, optionally, in addition to the foregoing steps, the communication method provided in this embodiment of this application further includes the following steps.

C1: The terminal device sends fifth capability information to the first network device or the second network device.

C2: The first network device or the second network device receives the fifth capability information sent by the terminal device.

The fifth capability information indicates:

the terminal device supports generating the first information according to a first algorithm;

the terminal device supports generating the first information according to a second algorithm; or the terminal device supports generating the first information according to a first algorithm and a second algorithm.

The first algorithm and the second algorithm are different algorithms.

The fifth capability information may be sent by the terminal device by using RRC signaling. The fifth capability information and the first capability information may be sent in a same piece of signaling, or the fifth capability information and the first capability information may be separately sent by using different pieces of signaling. This is not limited herein. In addition, the fifth capability information and the second capability information may be sent in a same piece of signaling, or the fifth capability information and the second capability information may be separately sent by using different pieces of signaling. This is not limited herein. An implementation of the fifth capability information depends on an application scenario, and is not limited herein.

The algorithm in this embodiment of this application may be a sequence generation method. Content or quantities of sequences generated by different algorithms are not completely the same. For example, a sequence ID used when the first algorithm generates a sequence is in a range of $\{0, \ldots, 1023\}$. For example, a sequence ID used when the second algorithm generates a sequence is in a range of $\{0, \ldots, 65535\}$.

In some embodiments of this application, optionally, in addition to the foregoing steps, the communication method provided in this embodiment of this application further includes the following steps.

D1: The terminal device sends sixth capability information to the first network device or the second network device.

D2: The first network device or the second network device receives the sixth capability information sent by the terminal device.

The sixth capability information includes at least one type of the following information: scrambling code information, location information, period information, interval information, frequency hopping information, density information, reserved time information, tuning time information, nonsimultaneous transmit information, and nonsimultaneous receive information.

The scrambling code information includes at least one of the following: a scrambling code range and a scrambling code value set.

The location information is a location at which the first information is sent and/or received and that can be supported by the terminal device.

The period information is a period in which the first information is sent and/or received and that can be supported by the terminal device.

The interval information is an interval that is between two consecutive times of sending and/or receiving the first information and that can be supported by the terminal device.

The frequency hopping information is one or more of whether the terminal device supports sending and/or receiving the first information in a frequency hopping manner, a quantity of hops for sending and/or receiving the first information in a specific time, a quantity of resource blocks RBs occupied for sending and/or receiving the first information at each hop, a resource width for sending and/or receiving the first information corresponding to each hop, a frequency hopping offset for sending and/or receiving the first information, a frequency resource range for sending and/or receiving the first information in a frequency hopping manner, and subcarrier spacing information for sending and/or receiving the first information.

The density information is a quantity of times that the terminal device sends and/or receives the first information within a specific time range.

The reserved time information is a time length that needs to be reserved before the terminal device sends and/or receives the first information, a time length that needs to be reserved after the terminal device sends and/or receives the first information, a time length that needs to be reserved between two times of sending the first information by the terminal device, or a time length that needs to be reserved between two times of receiving the first information by the terminal device.

The tuning time information is switching time between one time of sending first information by the terminal device and next time of sending first information, or switching time between one time of receiving first information by the terminal device and next time of receiving first information.

The nonsimultaneous transmit information indicates that when sending the first information, the terminal device does not support sending information other than the first information.

The nonsimultaneous receive information indicates that when receiving the first information, the terminal device does not support receiving information other than the first information.

The sixth capability information may be sent by the terminal device by using RRC signaling. The sixth capability information and the first capability information may be sent in a same piece of signaling, or the sixth capability information and the first capability information may be separately sent by using different pieces of signaling. This is not limited herein. In addition, the sixth capability information and the second capability information may be sent in a same piece of signaling, or the sixth capability information and the second capability information may be separately sent by using different pieces of signaling. This is not limited herein. An implementation of the sixth capability information depends on an application scenario, and is not limited herein.

Optionally, in some embodiments of this application, the first configuration information includes a configuration of a manner of sending and/or receiving the first information.

The manner of sending and/or receiving the first information includes: The terminal device sends and/or receives the first information based on the first capability information, or the terminal device sends and/or receives the first information based on the second capability information; or the manner of sending and/or receiving the first information includes: The terminal device generates the first information according to the first algorithm, or generates the first information according to the second algorithm, where the first algorithm and the second algorithm are different algorithms.

The terminal device obtains the first configuration information. The first configuration information has a plurality of implementations, for example, a configuration of a manner of sending and/or receiving the first information, for example, a configuration of a manner of sending the first information, or a configuration of a manner of receiving the first information. The manner of sending and/or receiving the first information includes: The terminal device sends and/or receives the first information based on the first capability information, or the terminal device sends and/or receives the first information based on the second capability information. In other words, the manner of sending and/or receiving the first information indicates to send and/or receive the first information based on the first capability information or the second capability information. The terminal device may obtain, by using the first configuration information, the configuration of the manner of sending and/or receiving the first information, so that the terminal device sends and/or receives the first information.

In addition, the manner of sending and/or receiving the first information includes: The terminal device generates the first information according to the first algorithm, or generates the first information according to the second algorithm. In other words, the manner of sending and/or receiving the first information indicates generation according to the first algorithm or the second algorithm. In this embodiment of this application, an algorithm used to generate the first information is not limited. The terminal device may obtain, by using the first configuration information, the configuration of the manner of sending and/or receiving the first information, so that the terminal device sends and/or receives the first information.

Optionally, in some embodiments of this application, the first configuration information includes information about sending and/or receiving the first information.

The information about sending and/or receiving the first information includes at least one of the following: scrambling code information, location information, period information, interval information, frequency hopping information, density information, guard time information, tuning time information, nonsimultaneous transmit information, and nonsimultaneous receive information.

The scrambling code information includes at least one of the following: a scrambling code range and a scrambling code value set.

The location information is a location at which the first information is sent and/or received and that can be supported by the terminal device.

The period information is a period in which the first information is sent and/or received and that can be supported by the terminal device.

The interval information is an interval that is between two consecutive times of sending and/or receiving the first information and that can be supported by the terminal device.

The frequency hopping information is one or more of whether the terminal device supports sending and/or receiving the first information in a frequency hopping manner, a quantity of hops for sending and/or receiving the first information in a specific time, a quantity of resource blocks RBs occupied for sending and/or receiving the first information at each hop, a resource width for sending and/or receiving the first information corresponding to each hop, a frequency hopping offset for sending and/or receiving the first information, a frequency resource range for sending and/or receiving the first information in a frequency hopping manner, and subcarrier spacing information for sending and/or receiving the first information.

The density information is a quantity of times that the terminal device sends and/or receives the first information within a specific time range.

The reserved time information is a time length that needs to be reserved before the terminal device sends and/or receives the first information, a time length that needs to be reserved after the terminal device sends and/or receives the first information, a time length that needs to be reserved between two times of sending the first information by the terminal device, or a time length that needs to be reserved between two times of receiving the first information by the terminal device.

The tuning time information is switching time between one time of sending first information by the terminal device and next time of sending first information, or switching time between one time of receiving first information by the terminal device and next time of receiving first information.

The nonsimultaneous transmit information indicates that when sending the first information, the terminal device does not support sending information other than the first information.

The nonsimultaneous receive information indicates that when receiving the first information, the terminal device does not support receiving information other than the first information.

It should be noted that the first configuration information includes the information about sending and/or receiving the first information. The foregoing plurality of configuration manners may be determined with reference to an application scenario. The terminal device obtains the first configuration information. The first configuration information has a plurality of implementations, for example, information about sending and/or receiving the first information, for example, information about sending the first information, or information about receiving the first information. The information about sending and/or receiving the first information includes at least one of the following: scrambling code information, location information, period information, interval information, frequency hopping information, density information, guard time information, tuning time information, nonsimultaneous transmit information nonsimultaneous receive information. The terminal device may obtain, by using the first configuration information, information for sending and/or receiving the first information, so that the terminal device sends and/or receives the first information.

Optionally, in some embodiments of this application, the first configuration information includes at least one of the following: whether frequency hopping is enabled, a frequency hopping time domain configuration, and a frequency hopping frequency domain configuration.

The frequency hopping time domain configuration includes at least one of the following: a start location, an interval, a period, a quantity of symbols occupied by each hop, and a frame or slot configuration.

The frequency hopping frequency domain configuration includes at least one of the following: a start RB location, a quantity of RBs occupied by each hop, a resource width corresponding to each hop, a quantity of hops on a frequency corresponding to a specific time, a frequency resource range of frequency hopping, subcarrier spacing information, and a frequency hopping offset.

Whether frequency hopping is enabled may be that frequency hopping is enabled or frequency hopping is not enabled. In addition, the first configuration information may further include the frequency hopping time domain configuration and the frequency hopping frequency domain configuration. Therefore, the terminal device can obtain, by using the first configuration information, frequency hopping information for sending and/or receiving the first information, so that the terminal device sends and/or receives the first information.

Optionally, in some embodiments of this application, the first configuration information indicates that a manner of sending and/or receiving the first information is one of the following: {first mode, no frequency hopping}, {second mode, frequency hopping}, or {second mode, no frequency hopping}.

The first mode indicates that the terminal device sends and/or receives the first information based on the first capability information.

The second mode indicates that the terminal device sends and/or receives the first information based on the second capability information.

The no frequency hopping indicates that the terminal device does not support sending and/or receiving the first information in a frequency hopping manner.

The frequency hopping indicates that the terminal device supports sending and/or receiving the first information in a frequency hopping manner.

A plurality of manners of sending and/or receiving the first information may be predefined. For example, the manner may include {first mode, no frequency hopping}, {second mode, frequency hopping}, and {second mode, no frequency hopping}. The first configuration information may indicate one of the foregoing manners. The terminal device may obtain, by using the first configuration information, the manner of sending and/or receiving the first information, so that the terminal device sends and/or receives the first information.

It may be understood that, in the foregoing implementation, a default configuration manner may be further predefined as {first mode, frequency hopping}. In this case, when the first configuration information does not indicate a manner of sending and/or receiving the first information, the terminal device may send and/or receive the first information in the default configuration manner {first mode, frequency hopping}.

For example, the first configuration information may be 2-bit indication information. Indication information 01 indicates that the manner of sending and/or receiving the first information is {first mode, no frequency hopping}, indication information 10 indicates that the manner of sending and/or receiving the first information is {second mode, frequency hopping}, and indication information 11 indicates that the manner of sending and/or receiving the first information is {second mode, no frequency hopping}. It is not limited that the indication information is 00 by default. The indication information 00 indicates that the manner of sending and/or receiving the first information is {first mode, frequency hopping}, or the manner of sending and/or receiving the first information may be {first mode, frequency hopping} by default. In this case, when the terminal device does not send the indication information, the terminal device sends and/or receives the first information in the manner of {first mode, frequency hopping} by default, to reserve an indication status.

Optionally, in some embodiments of this application, the first configuration information indicates that a manner of sending and/or receiving the first information is one of the following: {first mode, no frequency hopping}, {second mode, frequency hopping}, {second mode, no frequency hopping}, or {first mode, frequency hopping}.

The first mode indicates that the terminal device sends and/or receives the first information based on the first capability information.

The second mode indicates that the terminal device sends and/or receives the first information based on the second capability information.

The no frequency hopping indicates that the terminal device does not support sending and/or receiving the first information in a frequency hopping manner.

The frequency hopping indicates that the terminal device supports sending and/or receiving the first information in a frequency hopping manner.

A plurality of manners of sending and/or receiving the first information may be predefined. For example, the manner may include {first mode, no frequency hopping}, {second mode, frequency hopping}, {second mode, no frequency hopping}, and {first mode, frequency hopping}. The first configuration information may indicate one of the foregoing manners. The terminal device may obtain, by using the first configuration information, the manner of sending and/or receiving the first information, so that the terminal device sends and/or receives the first information.

Optionally, in some embodiments of this application, the terminal device sends and/or receives the first information in a predefined sending and/or receiving manner.

The predefined sending and/or receiving manner includes at least one of the following:

when a quantity of resources occupied for sending and/or receiving the first information is greater than or equal to the second quantity, sending and/or receiving, by the terminal device, the first information in a no frequency hopping manner;

when a quantity of resources occupied for sending and/or receiving the first information is not greater than the second quantity, sending and/or receiving, by the terminal device, the first information in a frequency hopping manner, or sending and/or receiving, by the terminal device, the first information based on a frequency hopping indication;

when a quantity of resources occupied for sending and/or receiving the first information is greater than or equal to the first quantity, sending and/or receiving, by the terminal device, the first information in a carrier aggregation manner; or when a quantity of resources occupied for sending and/or receiving the first information is not greater than the first quantity, sending and/or receiving, by the terminal device, the first information in a single carrier manner.

A plurality of sending and/or receiving manners may be predefined, and a trigger condition may be set in each manner. The trigger condition may be a condition that is set based on the quantity of resources occupied by the first information, the first quantity, and the second quantity. When a corresponding trigger condition is met, the terminal device sends and/or receives the first information in a predefined manner. Therefore, the terminal device may obtain, in the predefined manner, frequency hopping information and carrier aggregation information that are used to send and/or receive the first information, so that the terminal device sends and/or receives the first information.

Optionally, in some embodiments of this application, the first capability information includes at least one of the following:

a maximum bandwidth that can be occupied when the terminal device transmits the first information on a single carrier, a maximum bandwidth obtained after the terminal device supports carrier aggregation of the first information, and tuning time of the terminal device.

Optionally, in some embodiments of this application, the second capability information includes at least one of the following:

a maximum bandwidth used by the terminal device to transmit the second information, a maximum baseband bandwidth used by the terminal device to transmit the second information, a maximum radio frequency bandwidth used by the terminal device to transmit the second information, a maximum bandwidth obtained after transmission of the second information by the terminal device supports carrier aggregation, and tuning time used by the terminal device to perform carrier aggregation transmission.

Optionally, in some embodiments of this application, first configuration information includes a resource configuration occupied for sending and/or receiving the first information.

The resource configuration includes at least one of the following: a bandwidth configuration, a bandwidth part BWP configuration, a resource block RB configuration, and a subcarrier configuration.

The bandwidth configuration includes at least one of the following: a bandwidth size, a bandwidth location, a center frequency indication, a grid size, and an absolute frequency channel number.

The BWP configuration includes at least one of the following: a BWP size and a BWP location.

The RB configuration includes at least one of the following: a quantity of RBs occupied by the first information, an RB location occupied by the first information, and a start RB location occupied by the first information.

The subcarrier configuration includes a subcarrier spacing supported when the terminal device transmits the first information.

The terminal device obtains the first configuration information. The first configuration information has a plurality of implementations, for example, a resource configuration occupied for sending and/or receiving the first information. The resource configuration includes at least one of the following: a bandwidth configuration, a bandwidth part BWP configuration, a resource block RB configuration, and a subcarrier configuration. The terminal device may obtain, by using the first configuration information, the resource configuration for sending and/or receiving the first information, so that the terminal device sends and/or receives the first information.

It may be learned from the foregoing example description of the embodiment that the terminal device may establish a communication connection to at least one network device. For example, the terminal device separately establishes a communication connection to the first network device and the second network device, and the terminal device may separately report different capability information to the at least one network device, so that the terminal device reports a plurality of pieces of capability information to the network device. In other words, the terminal device may independently report different capability information to one network device, or the terminal device separately reports different capability information to different network devices. For example, the terminal device transmits the first capability information to the first network device, where the first capability information indicates that the terminal device supports sending and/receiving the first information by using a maximum of the first quantity of resources, and the first information includes the reference signal. The terminal device transmits the second capability information to the second network device, where the second capability information indicates that the terminal device supports sending and/or receiving the second information by using a maximum of the second quantity of resources, and the second information includes at least one of the following: the data or the control information. The terminal device obtains the first configuration information, where the first configuration information indicates that the quantity of resources configured for the first information is not greater than the first quantity. The terminal device obtains the second configuration information, where the second configuration information indicates that the quantity of resources configured for the second information is not greater than the second quantity. In this embodiment of this application, the terminal device may report, by using the first capability information, that the terminal device supports sending and/or receiving the reference signal by using a maximum of the first quantity of resources, and the terminal device may report, by using the second capability information, that the terminal device supports sending and/or receiving the second information by using a maximum of the second quantity of resources, so that the terminal device independently reports information about a capability of sending and/or receiving the reference signal. This resolves a communication problem of the terminal device that supports sending and/or receiving the reference signal.

The following describes a detailed application scenario.

This embodiment of this application may be applied to implement a high-precision positioning requirement of the terminal device (for example, RedCap UE) without greatly increasing complexity/costs/power consumption of the UE.

In this embodiment of this application, the UE determines a maximum resource (referred to as the "first resource") that can be used by the UE to send a positioning reference signal, and the UE determines a maximum resource (referred to as the "second resource") for data transmission (hereinafter briefly referred to as data transmission). The UE is new-form UE different from normal UE. The first resource may be greater than the second resource to implement high-precision positioning and low complexity. For example, the "transmission bandwidth capability of the positioning reference signal" is not limited to the "bandwidth capability of data transmission", and a carrier aggregation (CA) capability of the positioning reference signal and a CA capability of data transmission are configured differently. Details are provided below.

(1) The "transmission bandwidth capability of the positioning reference signal" may be greater than the "bandwidth capability of data transmission". For example, the bandwidth capability of data transmission of the RedCap UE is 20 MHz, and the transmission bandwidth capability of the positioning reference signal of the RedCap UE may be 40 MHz, 60 MHz, 80 MHz, or 100 MHz; or the "transmission bandwidth capability of the positioning reference signal" may be less than or equal to the "bandwidth capability of data transmission".

(2) When the uplink positioning reference signal supports CA, the data transmission (uplink sending or downlink receiving) of the UE may not support CA.

This embodiment of this application is applied to a 5G positioning scenario, and related network elements include an LMF, a base station (such as a gNB/ng-eNB), and UE.

This embodiment of this application is applied to a 5G positioning scenario, and functions of a network element include:

(1) The LMF sends an LTE positioning protocol (LPP) message to the UE, and the UE completes corresponding operations based on an indication of the LPP message, and reports location measurement information to the LMF according to a situation. Network elements related in this procedure include the LMF and the UE.

(2) The gNB/ng-eNB sends a radio resource control RRC message or a MAC control element (CE) to the UE, and the UE completes a corresponding operation based on an indication of the RRC message or the MAC CE, and reports an acknowledgment message to the gNB/ng-eNB according to a situation. Related network elements include the gNB/ng-eNB and the UE.

Interaction between UE and a network unit in this embodiment of this application is first described from a UE side.

The UE reports (maximum) resource capability information of an uplink positioning reference signal of the UE to the network unit (an LMF/a base station/another communication entity). The UE reports the (maximum) resource capability information of data transmission of the UE to the network unit. The UE may obtain configuration information of the uplink positioning reference signal from the network unit. The UE sends an SRS based on the configuration information that is of the positioning reference signal and that is received from the network unit.

The (maximum) resource capability of the uplink positioning reference signal reported by the UE may be greater than (or higher than) a (maximum) resource capability of data transmission. Certainly, the (maximum) resource capability of the uplink positioning reference signal reported by the UE may alternatively be not greater than (or not higher than) the (maximum) resource capability of data transmission.

The following provides descriptions from a network unit (an LMF/a base station/another communication entity) side.

The network unit may obtain the (maximum) resource capability information of the uplink positioning reference signal of the UE from the UE.

The network unit may obtain the (maximum) resource capability information of data transmission of the UE from the UE.

The network unit may obtain the configuration information of the uplink positioning reference signal of the UE from the UE.

The network unit may receive, based on reference signal configuration information, a sounding reference signal SRS transmitted by the UE.

In a positioning architecture based on a 5G core network, the LMF is responsible for supporting different types of location services related to the target UE, including positioning the UE and transferring assistance data to the UE. A control plane and a user plane of the LMF are an enhanced serving mobile location center (E-SMLC) and a secure user plane location platform (Secure User Plane Location, SLP), respectively. The LMF may exchange information with the ng-eNB/gNB and the UE.

Information exchange may be information exchange between the LMF and the ng-eNB/gNB by using an NRPPa (NR Positioning Protocol Annex) message, for example, obtaining PRS configuration information, SRS configuration information, cell timing information, and cell location information. The NRPPa is a signaling protocol between the LMF and a base station in a 5G system. The NRPPa message is a message carrier for signaling/information exchange between the LMF and the base station.

In addition, the information exchange may be UE capability information transfer, auxiliary information transfer, measurement information transfer, and the like performed with the UE by using an LTE positioning protocol (LPP) message, and may be information used to assist users in measurement or location calculation.

In a positioning architecture based on a 5G core network, an access and mobility management function (AMF) may receive a location service request related to target UE from a location service (LoCation Services, LCS) entity, or the AMF may start some location services on behalf of a specific target UE, and forward the location service request to the LMF. After receiving location information returned by the UE, the AMF returns related location information to the LCS entity. The LCS is a management module for interacting location traffic between the core network and the outside of the core network.

In the positioning architecture based on the 5G core network, the gNB/ng-eNB may provide measurement information for the target UE, and transfer the information to the LMF.

Figure 3A:
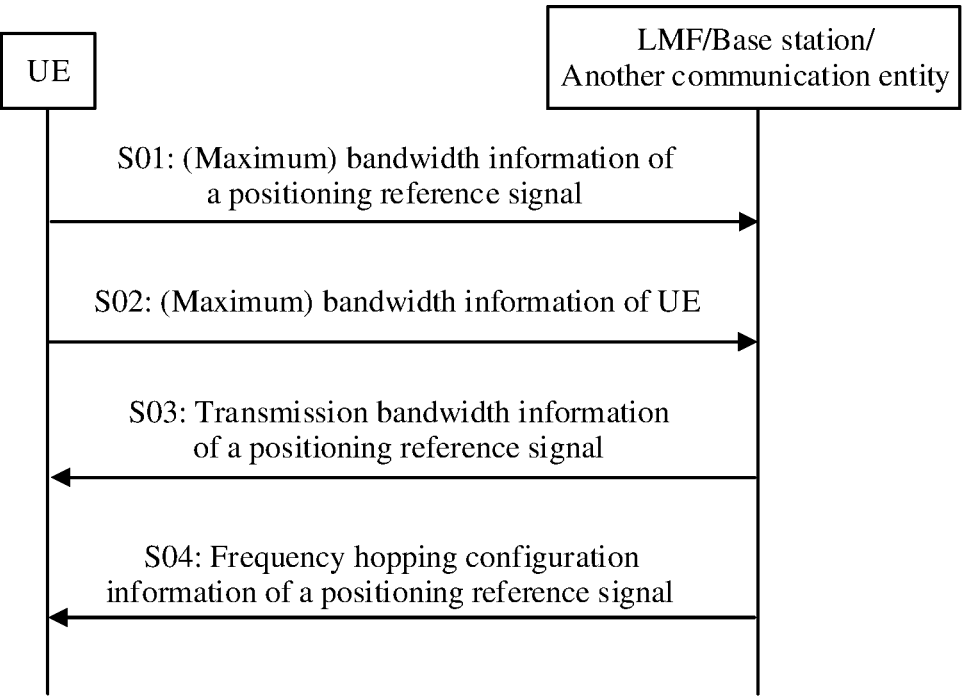
FIG. 3*a* is a flowchart of interaction between UE and a base station according to an embodiment of this application.

The following describes application scenarios in embodiments of this application by using two embodiments. Embodiment 1 is described from a UE side, and Embodiment 2 is described from a network device side. As shown in FIG. 3a, steps S01 and S02 are performed by UE, and steps S03 and S04 are performed by a network device.

Embodiment 1

To improve positioning accuracy, the UE may send a positioning reference signal on more (or larger) resources. However, to avoid greatly increasing costs of the UE, the UE can communicate with a peer device or perform data transmission only on less (or smaller) resources. In other words, a resource that can be used by the UE to send the positioning reference signal may be greater than a maximum resource that can be used when the UE communicates with the peer device or performs data transmission.

Because the UE can communicate with the peer device or performs data transmission only on less (or smaller) resources, complexity of a baseband processing capability of the UE is low. For example, the baseband processing may include data processing, control channel processing, channel estimation, channel measurement, multi-antenna signal processing, and the like. For example, the data processing may include: receiving, decoding, and detecting downlink data; and generating, encoding, and shaping uplink data. However, because the UE may send the positioning reference signal on more (or larger) resources, when the UE has a high-precision positioning capability, a maximum baseband processing capability of the UE does not match (for example, is the same as or equivalent to) a maximum resource supported by an uplink positioning reference signal of the UE, so that the UE can implement low complexity or low costs. In addition, the UE can communicate with the peer device or perform data transmission only on less (or smaller) resources, and power consumption overheads of the UE are reduced. This implements low power consumption.

It should be noted that the resource may be one or more of a bandwidth, a subband, a resource including one or more resource blocks, one or more carrier resources, a frequency range, a frequency segment, a frequency band, one or more subcarrier spacings, a quantity of subcarrier spacings, a bandwidth part BWP, a frequency hopping interval, and a quantity of frequency hops.

Figure 3B:
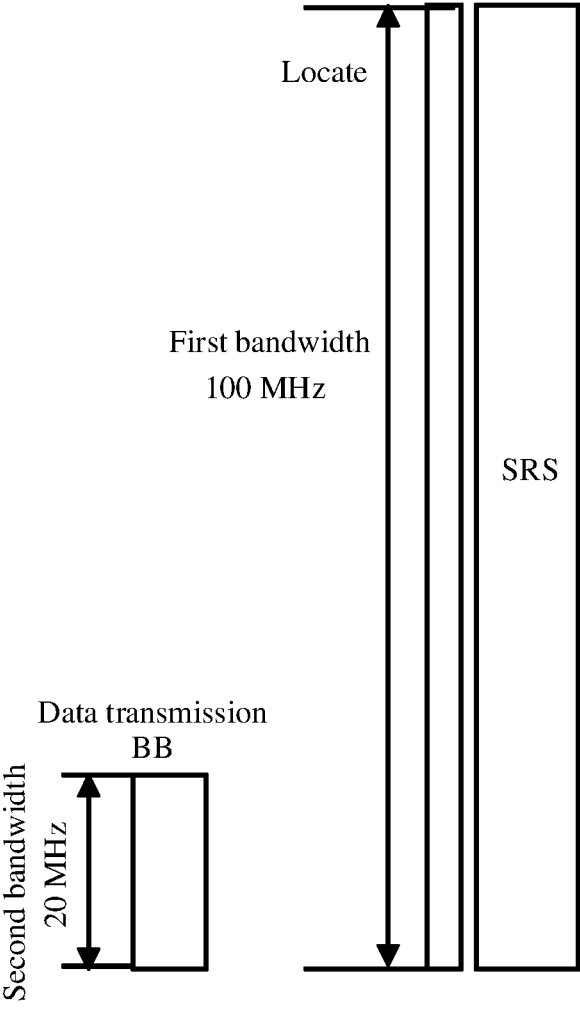
FIG. 3*b* is a diagram of configuring a first resource and a second resource by a base station according to an embodiment of this application.

Therefore, in this embodiment of this application, the UE determines a maximum resource (referred to as the "first resource") that can be used by the UE to send the positioning reference signal, and the UE determines a maximum resource (referred to as the "second resource") of data transmission. The UE is new-form UE different from normal UE. The first resource may be greater than the second resource, to implement high-precision positioning and low complexity. FIG. 3b is a diagram in which a first resource of UE is 100 MHz and a second resource of UE is 20 MHz.

The UE may report (maximum) resource capability information of an uplink positioning reference signal of the UE to the LMF or the base station (or another communication entity). The following describes key features of Embodiment 1.

Step S01: The UE reports the (maximum) resource capability information of the uplink positioning reference signal of the UE to the LMF or the base station (or another communication entity).

For example, the resource capability information of the uplink positioning reference signal includes one or more of a maximum bandwidth that can be occupied when the UE sends the positioning reference signal on a single carrier, whether the UE supports carrier aggregation CA of the uplink positioning reference signal, a quantity of carriers whose CA can be supported by the UE, a maximum bandwidth after the UE supports positioning reference signal CA, tuning time of the UE, and the like. The frequency hopping location scenario is mainly considered. During a next frequency hop, a central frequency of a carrier needs to be adjusted. Therefore, a hardware adjustment time that is referred to as "tuning time" is required.

For example, the resource capability information of the uplink positioning reference signal may indicate that the UE supports generating a sequence based on a type 1, or the UE supports generating an SRS sequence based on a type 2. Alternatively, the resource capability information of the uplink positioning reference signal may further indicate that the UE supports generating a sequence based on a type 1, or the UE supports generating a sequence based on a type 2, or the UE supports generating a sequence based on a type 1 and a type 2.

For example, the resource capability information of the uplink positioning reference signal may include scrambling code information used by the UE to generate the uplink positioning reference signal. The scrambling code information may be one or more of a scrambling code range and a scrambling code value set.

For example, the resource capability information of the uplink positioning reference signal may include one or more of location information, period information, interval information, frequency hopping information, density information, reserved time information, tuning time information, nonsimultaneous transmit information, and nonsimultaneous receive information that are used by the UE to generate the uplink positioning reference signal.

The location information may be a location that is for sending the uplink positioning reference signal and that can be supported by the UE, for example, a fixed location or a flexible location. Alternatively, a location at which the UE sends the uplink positioning reference signal is in a specific time of a synchronization signal block SSB. Because a location at which the UE sends the uplink positioning reference signal is in a specific time of the SSB, the UE can quickly implement synchronization tracking. This reduces power consumption. The UE may report a specific expected time value or range.

The period information may be a period that is of sending the uplink positioning reference signal and that can be supported by the UE.

The interval information may be a (minimum) interval that is between two consecutive times of sending the uplink positioning reference signal and that can be supported by the UE.

The frequency hopping information may be one or more of whether the uplink positioning reference signal of the UE supports frequency hopping, a quantity of hops in a specific time, a quantity of resource blocks RBs occupied by each hop (or a frequency width occupied by a signal at each hop), a second resource width at each hop, a frequency hopping offset, a frequency resource range of frequency hopping, and subcarrier spacing information. At least one of values of the frequency hopping offset can enable frequency resources of two adjacent uplink positioning reference signals to overlap. The first resource bandwidth is a bandwidth corresponding to a maximum resource that can be used by the UE to send the positioning reference signal. The second resource bandwidth is a bandwidth corresponding to a maximum resource for data transmission.

The density information may be a quantity of times that the UE sends the uplink positioning reference signal within a specific time range.

The reserved time information may be a time length that needs to be reserved before the UE sends the uplink positioning reference signal, or a time length that needs to be reserved after the UE sends the uplink positioning reference signal, or a time length that needs to be reserved between two times of sending the uplink positioning reference signal by the UE.

The tuning time information may be switching time from sending the uplink positioning reference signal by the UE to sending the uplink positioning reference signal next time.

The nonsimultaneous transmit information may indicate that when sending the uplink positioning reference signal, the UE does not support sending another (one or more types of) uplink signal.

The nonsimultaneous receive information may indicate that when sending the uplink positioning reference signal, the UE does not support receiving another (one or more types of) downlink signal.

Certainly, some resource capability information of the uplink positioning reference signal of the UE may alternatively be pre-specified. In this way, the UE does not need to report the pre-specified resource capability information. For example, the reserved time information is pre-specified, or the nonsimultaneous transmit information is pre-specified, or the nonsimultaneous receive information is pre-specified. For example, time that the UE needs to reserve before or after sending the uplink positioning reference signal is pre-specified. For example, it is pre-specified that when sending the uplink positioning reference signal, the UE cannot send a physical uplink shared channel PUSCH and/or a physical uplink control channel PUCCH. For example, it is pre-specified that when sending the uplink positioning reference signal, the UE cannot receive a PDSCH and/or a PDCCH. For example, it is pre-specified that a location at which the UE sends the uplink positioning reference signal is within n ms after an SSB. For example, n=5 or n=10.

The resource capability of the UE is pre-specified, or the UE may further report resource capability information of the UE to the LMF or the base station (or another communication entity). For example, the resource capability information of the UE is a (maximum) resource capability of data transmission. For example, a maximum bandwidth for data transmission of the UE is pre-specified, or it is pre-specified that data transmission of the UE does not support CA. For example, Step S02: The UE reports (maximum) resource capability information of data transmission of the UE to the LMF or the base station (or another communication entity).

For example, the resource capability information of data transmission includes one or more of a maximum bandwidth for data transmission of the UE, a maximum baseband bandwidth for data transmission of the UE, a maximum radio frequency bandwidth for data transmission of the UE, carrier aggregation CA that the UE does not support for data transmission, a quantity of carriers whose CA can be supported by the UE data transmission, a maximum bandwidth after data transmission of the UE supports CA, tuning time for data transmission of the UE, and the like.

The maximum bandwidth is a maximum bandwidth for data transmission of the UE.

The following describes the maximum baseband bandwidth and the maximum radio frequency bandwidth. First, the "baseband bandwidth" and the "radio frequency bandwidth" are explained.

The baseband bandwidth is an inherent frequency band (a frequency bandwidth) of an original electrical signal that is sent by a source (an information source, also referred to as a sending terminal) and on which modulation (spectrum migration and conversion) is not performed, and is referred to as a basic frequency band and briefly referred to as a baseband. The radio frequency bandwidth is a frequency band (a frequency bandwidth) of a baseband signal on which modulation (spectrum shift and conversion) is performed.

In this embodiment of this application, maximum data transmission bandwidth=maximum baseband bandwidth-≤maximum radio frequency bandwidth.

It should be noted that the (maximum) resource capability of the uplink positioning reference signal reported by the UE may be greater than (or higher than) a (maximum) resource capability of data transmission. Certainly, the (maximum) resource capability of the uplink positioning reference signal reported by the UE may alternatively be not greater than (or not higher than) the (maximum) resource capability of data transmission.

FIG. 3b is a diagram in which UE reports resource capability information of an uplink positioning reference signal of the UE and resource capability information of the UE to an LMF or a base station.

The following provides several examples for description.

For example, the resource capability information of the uplink positioning reference signal reported by the UE is as follows:

{Bandwidth (RB): ENUMERATED {n50, n100, n200, n300, n400, . . . }. SCS: {15 KHz, 30 KHz, . . . }. CA info}.

For example, the resource capability information of the uplink positioning reference signal reported by the UE is as follows:

{Bandwidth (MHz): ENUMERATED {n10, n20, n40, n60, n100, n200, . . . }. SCS: {15 KHz, 30 KHz, . . . }}.

For example, a bandwidth of the uplink positioning reference signal reported by the UE is 100 MHz, and a bandwidth of the UE is 20 MHz.

For example, a bandwidth of the uplink positioning reference signal reported by the UE is N RBs, and a bandwidth of the UE is M RBs, where N>M.

For example, the uplink positioning reference signal reported by the UE supports carrier aggregation, but data transmission of the UE does not support carrier aggregation.

The UE may obtain configuration information of the uplink positioning reference signal from the LMF or the base station (or another communication entity).

For example, the configuration information of the uplink positioning reference signal includes one or more of the following: a. transmission information of the uplink positioning reference signal; and b. configuration information related to frequency hopping (FH).

a. Transmission Information of the Uplink Positioning Reference Signal

For example, the transmission information of the uplink positioning reference signal includes a configuration of a resource occupied for transmitting the uplink positioning reference signal and/or a configuration of a transmission manner.

As described above, the resource may be one or more of a bandwidth, a BWP, an RB, and a subcarrier. A bandwidth configuration may include one or more of a bandwidth size, a bandwidth location, a center frequency indication, a grid (raster) size, an absolute frequency channel number, and the like. A BWP configuration may include one or more of a BWP size and a BWP location. An RB configuration may include one or more of a quantity of occupied RBs, an occupied RB location, and a start RB location. A subcarrier configuration may include a supported subcarrier spacing. "Grid" is a type of bandwidth configuration parameters. Grid data is used to divide space into regular grids. Each grid is referred to as a unit. During bandwidth configuration, the "grid size" refers to a granularity of dividing an entire frequency band.

For example, the transmission manner includes: whether the uplink positioning reference signal is transmitted based on a resource capability of the uplink positioning reference signal of the UE, or the uplink positioning reference signal is transmitted based on a resource capability of data transmission of the UE.

For example, the transmission manner includes: whether a sequence of the uplink positioning reference signal is generated based on a type 1 or a sequence of the uplink positioning reference signal is generated based on a type 2.

For example, the transmission information of the uplink positioning reference signal may include scrambling code information used by the UE to generate the uplink positioning reference signal. The scrambling code information may be one or more of a scrambling code range and a scrambling code value set.

For example, the transmission information of the uplink positioning reference signal may include one or more of the following: location information, period information, interval information, frequency hopping information, density information, guard time information, tuning time information, nonsimultaneous transmit information, and nonsimultaneous receive information of the uplink positioning reference signal.

The location information may be a location at which the uplink positioning reference signal is sent. For example, the location at which the uplink positioning reference signal is sent is in a specific time of an SSB. Because it is specified that the location at which the UE sends the uplink positioning reference signal is within the specific time of the SSB, the UE can quickly implement synchronization tracking. This reduces power consumption.

The period information may be a period of sending the uplink positioning reference signal.

The interval information may be a (minimum) interval between two consecutive times of sending the uplink positioning reference signal.

The density information may be a quantity of times of sending the uplink positioning reference signal within a specific time range.

The reserved guard time information may be a time length that needs to be reserved before the uplink positioning reference signal is sent, or a time length that needs to be reserved after the uplink positioning reference signal is sent, or a time length that needs to be reserved between two times of sending the uplink positioning reference signal.

The tuning time information may be switching time from sending the uplink positioning reference signal to sending the uplink positioning reference signal next time.

The nonsimultaneous transmit information may indicate that when sending the uplink positioning reference signal, the UE does not send another (one or more types of) uplink signal information.

The nonsimultaneous receive information may indicate that when sending the uplink positioning reference signal, the UE does not receive another (one or more types of) downlink signal information.

b. Configuration Information Related to Frequency Hopping (FH)

For example, the configuration information related to frequency hopping includes one or more of the following:
enabling/disabling frequency hopping.

Frequency hopping time domain configuration (one or more of a start location, an interval, a period, a quantity of symbols occupied by each hop, and a frame/slot configuration).

Frequency hopping frequency domain configuration (one or more of a start RB location, a quantity of RBs occupied by each hop (or one or more of a frequency width occupied by a signal at each hop), a second resource width (for example, used for phase estimation) of each hop, a quantity of hops on a frequency in a specific time, a frequency resource range of frequency hopping, subcarrier spacing information, and a frequency hopping offset). At least one of values of the frequency hopping offset can enable frequency resources of two adjacent uplink positioning reference signals to overlap.

During frequency hopping transmission, for example, for an FR1, a maximum quantity of RBs included in each hop is an integer multiple, or ½ or ¼ times of 100 (or 50, or 106). For example, a value of a start RB of a first hop is $\{0, \ldots, X-1\}$, where X is determined based on one or more of a quantity of hops on a frequency, a remainder RB, a carrier bandwidth, a BWP size, and a subcarrier spacing SCS. In particular, X=19, or X=49. The quantity of hops on a frequency is a quantity of times that the UE performs frequency hopping sending on a specified frequency, and the remainder RB refers to a quantity of RBs remaining after the UE sends all SRSs in a frequency hopping manner on the specified frequency.

Alternatively, the UE may obtain indication information of a transmission manner of the uplink positioning reference signal from the LMF or the base station (or another communication entity).

For example, the following defines a first mode and a second mode.

In a first mode, the uplink positioning reference signal is transmitted based on a resource capability of the uplink positioning reference signal of the UE.

In a second mode, the uplink positioning reference signal is transmitted based on a resource capability of data transmission of the UE.

For example, the LMF or the base station (or another communication entity) indicates a transmission manner for the UE in the following sets:
{first mode, no frequency hopping}, {second mode, frequency hopping}, and {second mode, no frequency hopping}.

For example, the LMF or the base station (or another communication entity) indicates a transmission manner for the UE in the following sets:
{first mode, no frequency hopping}, {second mode, frequency hopping}, {second mode, no frequency hopping}, and {first mode, frequency hopping}.

For example, the transmission manner is predefined.

For example, when a resource occupied by transmission of the uplink positioning reference signal is greater than or equal to a resource capability of the UE, the uplink positioning reference signal is transmitted without frequency hopping (or without a frequency hopping indication), or may be transmitted through frequency hopping (or transmitted based on a frequency hopping indication).

For example, when a resource occupied by transmission of the uplink positioning reference signal is not greater than a resource capability of the UE, the uplink positioning reference signal is transmitted through frequency hopping (or transmitted based on a frequency hopping indication).

For example, when a resource occupied by transmission of the uplink positioning reference signal is greater than or equal to a resource capability of the uplink positioning reference signal of the UE, the uplink positioning reference signal is transmitted based on carrier aggregation. For example, when a resource capability of the uplink positioning reference signal of the UE is 100 MHz, the UE may transmit the uplink positioning reference signal in a carrier aggregation manner, and an occupied spectrum resource may be 100 MHz, 200 MHz, 300 MHz, or the like.

For example, when a resource occupied by transmission of the uplink positioning reference signal is not greater than a resource capability of the uplink positioning reference signal of the UE, the uplink positioning reference signal is transmitted based on a single carrier.

The resource occupied by transmission of the uplink positioning reference signal may be greater than the resource capability of the UE. Depending on a configuration of the base station, the resource occupied by transmission of the uplink positioning reference signal may alternatively be not greater than the resource capability of the UE. In particular, even if the resource occupied by transmission of the uplink positioning reference signal is greater than the resource capability of the UE, a network may further configure the UE to send the uplink positioning reference signal in a frequency hopping manner, to implement better positioning performance. In particular, even if the resource occupied by transmission of the uplink positioning reference signal is greater than the resource capability of the UE, the UE may further send the uplink positioning reference signal in a frequency hopping manner, to implement better positioning performance.

The configuration information of the uplink positioning reference signal includes transmission bandwidth information.

The UE sends an SRS based on the configuration information that is of the positioning reference signal and that is received from the LMF or the base station.

Unless otherwise specified, in this embodiment of this application, an example in which a resource is a bandwidth is used to describe implementation of this embodiment of this application. However, it should be noted that when the resource has another definition, the definition is the same as the protection content of this embodiment of this application.

Unless otherwise specified, in this embodiment of this application, the uplink positioning reference signal is used as an example to describe implementation of this embodiment of this application. However, it should be noted that the uplink positioning reference signal in this embodiment of this application may be replaced with another signal or channel (for example, another uplink signal or channel, or another downlink signal or channel). This also belongs to the protection content of this embodiment of this application. PRS: positioning downlink.

In this embodiment of this application, transmission may be sending and/or receiving. When transmission on one side of communication is sending, transmission on a peer device of communication is receiving.

In Embodiment 1, the UE determines the maximum bandwidth for sending the positioning reference signal by the UE, and the UE determines the maximum bandwidth of data transmission. This can effectively avoid greatly increasing complexity/costs of the UE while ensuring high-precision positioning, and help reduce power consumption of the UE.

Currently, the maximum bandwidth of the positioning signal is tightly coupled to the data transmission bandwidth of the UE. In Embodiment 1, the UE determines the maximum bandwidth of the positioning signal, and the UE determines the data transmission bandwidth of the UE. In other words, the maximum bandwidth for sending the positioning reference signal by the UE is no longer limited to the data transmission bandwidth of the UE.

Embodiment 2

Embodiment 2 is for a network unit. For example, the network unit may be an LMF, a base station, or another communication entity. As shown in FIG. 3a, the method mainly includes the following steps.

Step S03: The network unit may obtain the (maximum) resource capability information of the uplink positioning reference signal of the UE from the UE.

For example, the resource capability information of the uplink positioning reference signal includes one or more of a maximum bandwidth that can be occupied when the UE sends the positioning reference signal on a single carrier, whether the UE supports carrier aggregation CA of the uplink positioning reference signal, a quantity of carriers whose CA can be supported by the UE, a maximum bandwidth after the UE supports positioning reference signal CA, tuning time of the UE, and the like.

For example, the resource capability information of the uplink positioning reference signal may indicate that the UE supports generating a sequence based on a type 1, or the UE supports generating a sequence based on a type 2. Alternatively, the resource capability information of the uplink positioning reference signal may further indicate that the UE supports generating a sequence based on a type 1, or the UE supports generating a sequence based on a type 2, or the UE supports generating a sequence based on a type 1 and a type 2.

For example, the resource capability information of the uplink positioning reference signal may include scrambling code information used by the UE to generate the uplink positioning reference signal. The scrambling code information may be one or more of a scrambling code range and a scrambling code value set.

For example, the resource capability information of the uplink positioning reference signal may include one or more of location information, period information, interval information, frequency hopping information, density information, reserved time information, tuning time information, nonsimultaneous transmit information, and nonsimultaneous receive information of the uplink positioning reference signal of the UE.

The location information may be a location that is for sending the uplink positioning reference signal and that can be supported by the UE, for example, a fixed location or a flexible location. Alternatively, a location at which the UE sends the uplink positioning reference signal is in a specific time of an SSB. Because a location at which the UE sends the uplink positioning reference signal is in a specific time of the SSB, the UE can quickly implement synchronization tracking. This reduces power consumption. The location information obtained from the UE may be an expected specific time value or range.

The period information may be a period that is of sending the uplink positioning reference signal and that can be supported by the UE.

The interval information may be a (minimum) interval that is between two consecutive times of sending the uplink positioning reference signal and that can be supported by the UE.

The frequency hopping information may be one or more of whether the uplink positioning reference signal of the UE supports frequency hopping, a quantity of hops in a specific time, a quantity of RBs occupied by each hop (or a frequency width occupied by a signal at each hop), a second resource width at each hop, a frequency hopping offset, a frequency resource range of frequency hopping, and subcarrier spacing information. At least one of values of the frequency hopping offset can enable frequency resources of two adjacent uplink positioning reference signals to overlap.

The density information may be a quantity of times that the UE sends the uplink positioning reference signal within a specific time range.

The reserved time information may be a time length that needs to be reserved before the UE sends the uplink positioning reference signal, or a time length that needs to be reserved after the UE sends the uplink positioning reference signal, or a time length that needs to be reserved between two times of sending the uplink positioning reference signal by the UE.

The tuning time information may be switching time from sending the uplink positioning reference signal by the UE to sending the uplink positioning reference signal next time.

The nonsimultaneous transmit information may indicate that when sending the uplink positioning reference signal, the UE does not support sending another (one or more types of) uplink signal.

The nonsimultaneous receive information may indicate that when sending the uplink positioning reference signal, the UE does not support receiving another (one or more types of) downlink signal.

Alternatively, the network unit may pre-specify some resource capability information of the uplink positioning reference signal of the UE. For example, the reserved time information is pre-specified, or the nonsimultaneous transmit information is pre-specified, or the nonsimultaneous receive information is pre-specified. For example, time that the UE needs to reserve before or after sending the uplink positioning reference signal is pre-specified. For example, it is pre-specified that when sending the uplink positioning reference signal, the UE cannot send a PUSCH and/or a PUCCH. For example, it is pre-specified that when sending the uplink positioning reference signal, the UE cannot receive a PDSCH and/or a PDCCH. For example, it is pre-specified that a location at which the UE sends the uplink positioning reference signal is within n ms after an SSB. For example, n=5 or n=10.

A resource capability of the UE is pre-specified, or the network unit may further obtain resource capability information of the UE from the UE. For example, the resource capability information of the UE is a (maximum) resource capability of data transmission. For example, a maximum bandwidth for data transmission of the UE is pre-specified, or it is pre-specified that data transmission of the UE does not support CA. For example, Step S04: The network unit may obtain the (maximum) resource capability information of data transmission of the UE from the UE.

For example, the resource capability information of data transmission includes one or more of a maximum bandwidth for data transmission of the UE, a maximum baseband bandwidth for data transmission of the UE, a maximum radio frequency bandwidth for data transmission of the UE, carrier aggregation CA that the UE does not support for data transmission, a quantity of carriers whose CA can be supported by the UE data transmission, a maximum bandwidth after data transmission of the UE supports CA of the positioning reference signal, tuning time for data transmission of the UE, and the like.

It should be noted that the (maximum) resource capability of the uplink positioning reference signal of the UE may be greater than (or higher than) a (maximum) resource capability of data transmission. Certainly, the (maximum) resource capability of the uplink positioning reference signal of the UE may alternatively be not greater than (or not higher than) the (maximum) resource capability of data transmission.

The following provides several examples for description.

For example, the resource capability information of the uplink positioning reference signal obtained from the UE is as follows:

{Bandwidth (RB): ENUMERATED {n50, n100, n200, n300, n400, . . . }. SCS: {15 KHz, 30 KHz, . . . }CA info}

For example, the resource capability information of the uplink positioning reference signal obtained from the UE is as follows:

{Bandwidth (MHz): ENUMERATED {n10, n20, n40, n60, n100, n200, . . . } SCS: {15 KHz, 30 KHz, . . . }}

For example, a bandwidth of the uplink positioning reference signal obtained from the UE is 100 MHz, and a bandwidth of the UE is 20 MHz.

For example, a bandwidth of the uplink positioning reference signal obtained from the UE is N RBs, and a bandwidth of the UE is M RBs, where N>M.

For example, the uplink positioning reference signal obtained from the UE supports carrier aggregation, but data transmission of the UE does not support carrier aggregation.

The network unit may send the configuration information of the uplink positioning reference signal of the UE to the UE.

For example, the configuration information of the uplink positioning reference signal includes one or more of the following: a. transmission information of the uplink positioning reference signal; and b. configuration information related to frequency hopping.

a. Transmission Information of the Uplink Positioning Reference Signal

For example, the transmission information of the uplink positioning reference signal includes a configuration of a resource occupied for transmitting the uplink positioning reference signal and/or a configuration of a transmission manner.

As described above, the resource may be one or more of a bandwidth, a BWP, an RB, and a subcarrier. A bandwidth configuration may include one or more of a bandwidth size, a bandwidth location, a center frequency indication, a grid (raster) size, an absolute frequency channel number, and the like. A BWP configuration may include one or more of a BWP size and a BWP location. An RB configuration may include one or more of a quantity of occupied RBs, an occupied RB location, and a start RB location. A subcarrier configuration may include a supported subcarrier spacing.

For example, the transmission manner includes: whether the uplink positioning reference signal is transmitted based on a resource capability of the uplink positioning reference signal of the UE, or the uplink positioning reference signal is transmitted based on a resource capability of data transmission of the UE.

For example, the transmission manner includes: whether a sequence of the uplink positioning reference signal is generated based on a type 1 or a sequence of the uplink positioning reference signal is generated based on a type 2.

For example, the transmission information of the uplink positioning reference signal may include scrambling code information used by the UE to generate the uplink positioning reference signal. The scrambling code information may be one or more of a scrambling code range and a scrambling code value set.

For example, the transmission information of the uplink positioning reference signal may include one or more of location information, period information, interval information, frequency hopping information, density information, guard time information, and tuning time information of the uplink positioning reference signal.

The location information may be a location at which the uplink positioning reference signal is sent. For example, the location at which the uplink positioning reference signal is sent is in a specific time of an SSB. Because it is specified that the location at which the UE sends the uplink positioning reference signal is within the specific time of the SSB, the UE can quickly implement synchronization tracking. This reduces power consumption.

The period information may be a period of sending the uplink positioning reference signal.

The interval information may be a (minimum) interval between two consecutive times of sending the uplink positioning reference signal.

The density information may be a quantity of times of sending the uplink positioning reference signal within a specific time range.

The reserved guard time information may be a time length that needs to be reserved before the uplink positioning reference signal is sent, or a time length that needs to be reserved after the uplink positioning reference signal is sent, or a time length that needs to be reserved between two times of sending the uplink positioning reference signal.

The tuning time information may be switching time from sending the uplink positioning reference signal to sending the uplink positioning reference signal next time.

The nonsimultaneous transmit information may indicate that when sending the uplink positioning reference signal, the UE does not send another (one or more types of) uplink signal information.

The nonsimultaneous receive information may indicate that when sending the uplink positioning reference signal, the UE does not receive another (one or more types of) downlink signal information.

b. Configuration Information Related to Frequency Hopping

For example, the configuration information related to frequency hopping includes one or more of the following:

enabling/disabling frequency hopping.

Frequency hopping time domain configuration (one or more of a start location, an interval, a period, a quantity of symbols occupied by each hop, and a frame/slot configuration).

Frequency hopping frequency domain configuration (one or more of a start RB location, a quantity of RBs occupied by each hop (or one or more of a frequency width occupied by a signal at each hop), a second resource width (for example, used for phase estimation) of each hop, a quantity of hops on a frequency in a specific time, a frequency resource range of frequency hopping, subcarrier spacing information, and a frequency hopping offset). At least one of values of the frequency hopping offset can enable frequency resources of two adjacent uplink positioning reference signals to overlap.

During frequency hopping transmission, for example, for an FR1, a maximum quantity of RBs included in each hop is an integer multiple, or $\frac{1}{2}$ or $\frac{1}{4}$ times of 100 (or 50, or 106). For example, a value of a start RB of a first hop is $\{0, \ldots, X-1\}$, where X is determined based on one or more of a quantity of hops on a frequency, a remainder RB, a carrier bandwidth, a BWP size, and an SCS. In particular, X=19, or X=49.

Alternatively, the network unit may send indication information of a transmission manner of the uplink positioning reference signal of the UE to the UE.

For example, the following defines a first mode and a second mode.

In a first mode, the uplink positioning reference signal is transmitted based on a resource capability of the uplink positioning reference signal of the UE.

In a second mode, the uplink positioning reference signal is transmitted based on a resource capability of data transmission of the UE.

For example, the network unit indicates the transmission manner for the UE in the following sets:

{first mode, no frequency hopping}, {second mode, frequency hopping}, and {second mode, no frequency hopping}.

For example, the network unit indicates the transmission manner for the UE in the following sets:

{first mode, no frequency hopping}, {second mode, frequency hopping}, {second mode, no frequency hopping}, and {first mode, frequency hopping}.

For example, the transmission manner is predefined.

For example, when a resource occupied by transmission of the uplink positioning reference signal is greater than or equal to a resource capability of the UE, the uplink positioning reference signal is transmitted without frequency hopping (or without a frequency hopping indication), or may be transmitted through frequency hopping (or transmitted based on a frequency hopping indication).

For example, when a resource occupied by transmission of the uplink positioning reference signal is not greater than a resource capability of the UE, the uplink positioning reference signal is transmitted through frequency hopping (or transmitted based on a frequency hopping indication).

For example, when a resource occupied by transmission of the uplink positioning reference signal is greater than or equal to a resource capability of the uplink positioning reference signal of the UE, the uplink positioning reference signal is transmitted based on carrier aggregation. For example, when a resource capability of the uplink positioning reference signal of the UE is 100 MHz, the UE may transmit the uplink positioning reference signal in a carrier aggregation manner, and an occupied spectrum resource may be 100 MHz, 200 MHz, 300 MHz, or the like.

For example, when a resource occupied by transmission of the uplink positioning reference signal is not greater than a resource capability of the uplink positioning reference signal of the UE, the uplink positioning reference signal is transmitted based on a single carrier.

The resource occupied by transmission of the uplink positioning reference signal may be greater than the resource capability of the UE. Depending on a configuration of the base station, the resource occupied by transmission of the uplink positioning reference signal may alternatively be not greater than the resource capability of the UE. In particular, even if the resource occupied by transmission of the uplink positioning reference signal is greater than the resource capability of the UE, a network may further configure the UE to send the uplink positioning reference signal in a frequency hopping manner, to implement better positioning performance. In particular, even if the resource occupied by transmission of the uplink positioning reference signal is greater than the resource capability of the UE, the UE may further send the uplink positioning reference signal in a frequency hopping manner, to implement better positioning performance.

The network unit may receive, based on reference signal configuration information, an SRS transmitted by the UE.

In Embodiment 2, a network unit (for example, an LMF/a base station/another communication entity) sends configuration information of a positioning reference signal of the UE to the UE, and may indicate or configure a transmission bandwidth, a transmission manner, whether frequency hopping is performed, whether CA is supported, and the like, so that different positioning traffic requirements can be met. This effectively avoids a significant increase in complexity/costs/power consumption of the UE.

In Embodiment 2, the network unit (for example, the LMF/the base station/another communication entity) sends the configuration information of the positioning reference signal to the UE, including an indication of a transmission bandwidth and a transmission manner, a report of a joint capability of an SRS bandwidth and frequency hopping, a detailed start resource indication, and the like. Currently, such a fine-grained and flexible configuration is not performed for the SRS configuration information.

It should be noted that, for brevity, the foregoing method embodiments are represented as a series of actions. However, a person skilled in the art should appreciate that embodiments of this application is not limited to the order of the described actions, because according to embodiments of this application, some steps may adopt other order or occur simultaneously. In addition, a person skilled in the art should also appreciate that all the embodiments described in the specification are example embodiments, and the related actions and modules are not necessarily mandatory to embodiments of this application.

To better implement the solutions of embodiments of this application, a related apparatus for implementing the solutions is further provided below.

Figure 4:
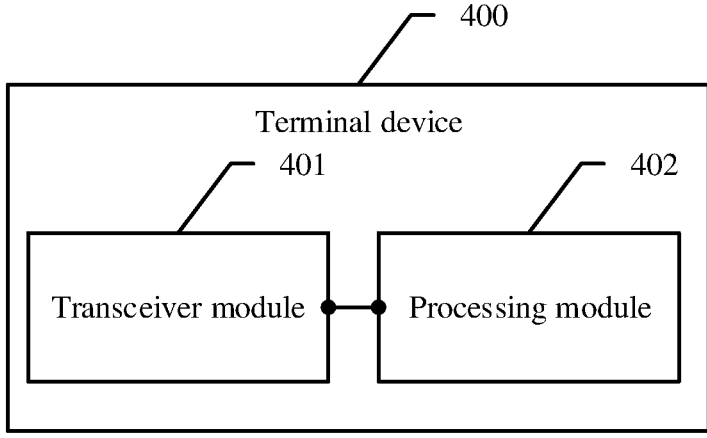
FIG. 4 is a diagram of a terminal device according to an embodiment of this application.

As shown in FIG. 4, an embodiment of this application provides a communication apparatus. The communication apparatus may be a terminal device, an apparatus in the terminal device, or an apparatus that can be collaboratively used with the terminal device. FIG. 4 is shown by using an example in which the communication apparatus is a terminal device 400. The terminal device 400 may include a transceiver module 401 and a processing module 402.

The transceiver module is configured to transmit first capability information to a first network device, where the first capability information indicates that the terminal device supports sending and/or receiving first information by using a maximum of a first quantity of resources, and the first information includes a reference signal.

The transceiver module is configured to transmit second capability information to a second network device, where the second capability information indicates that the terminal device supports sending and/or receiving second information by using a maximum of a second quantity of resources, and the second information includes at least one of the following: data or control information.

The processing module is configured to obtain first configuration information, where the first configuration information indicates that a quantity of resources configured for the first information is not greater than the first quantity.

The processing module is configured to obtain second configuration information, where the second configuration information indicates that a quantity of resources configured for the second information is not greater than the second quantity.

In an implementation, the first quantity is greater than the second quantity.

In an implementation, the first quantity belongs to a first quantity set, and at least one quantity in the first quantity set is greater than the second quantity;

the first quantity belongs to a first quantity set, the second quantity is predefined, and at least one quantity in the first quantity set is greater than the second quantity;

the first quantity belongs to a first quantity set, the second quantity belongs to a second quantity set, and at least one quantity in the first quantity set is greater than the second quantity;

the first quantity belongs to a first quantity set, the second quantity belongs to a second quantity set, and at least one quantity in the first quantity set is greater than all quantities in the second quantity set;

the first quantity is predefined, the second quantity is predefined, and the first quantity is greater than the second quantity; or the first quantity is predefined, the second quantity is predefined, and the first quantity is not greater than the second quantity.

In an implementation, the resource is one or more of a bandwidth, a resource block, a carrier, a subband, a frequency range, a frequency segment, a frequency band, a subcarrier spacing, a bandwidth part BWP, a frequency hopping interval, and a quantity of frequency hops within a specific time range.

In an implementation, the transceiver module is configured to send third capability information to the first network device or the second network device.

The third capability information indicates:

whether the terminal device supports sending and/or receiving the first information in a carrier aggregation manner; and/or the terminal device supports sending and/or receiving the first information by using a maximum of M carriers, where M is a positive integer.

In an implementation, the transceiver module is configured to send fourth capability information to the first network device or the second network device.

The fourth capability information indicates:

the terminal device does not support sending and/or receiving the second information in a carrier aggregation manner; or the terminal device supports sending and/or receiving the second information by using a maximum of N carriers, where N is a positive integer.

In an implementation, N is less than M; or

N is not greater than M.

In an implementation, the transceiver module is configured to send fifth capability information to the first network device or the second network device.

The fifth capability information indicates:

the terminal device supports generating the first information according to a first algorithm;

the terminal device supports generating the first information according to a second algorithm; or the terminal device supports generating the first information according to a first algorithm and a second algorithm.

The first algorithm and the second algorithm are different algorithms.

In an implementation, the transceiver module is configured to send sixth capability information to the first network device or the second network device.

The sixth capability information includes at least one type of the following information: scrambling code information, location information, period information, interval information, frequency hopping information, density information, reserved time information, tuning time information, nonsimultaneous transmit information, and nonsimultaneous receive information.

The scrambling code information includes at least one of the following: a scrambling code range and a scrambling code value set.

The location information is a location at which the first information is sent and/or received and that can be supported by the terminal device.

The period information is a period in which the first information is sent and/or received and that can be supported by the terminal device.

The interval information is an interval that is between two consecutive times of sending and/or receiving the first information and that can be supported by the terminal device.

The frequency hopping information is one or more of whether the terminal device supports sending and/or receiving the first information in a frequency hopping manner, a quantity of hops for sending and/or receiving the first information in a specific time, a quantity of resource blocks RBs occupied for sending and/or receiving the first information at each hop, a resource width for sending and/or receiving the first information corresponding to each hop, a frequency hopping offset for sending and/or receiving the first information, a frequency resource range for sending and/or receiving the first information in a frequency hopping manner, and subcarrier spacing information for sending and/or receiving the first information.

The density information is a quantity of times that the terminal device sends and/or receives the first information within a specific time range.

The reserved time information is a time length that needs to be reserved before the terminal device sends and/or receives the first information, a time length that needs to be reserved after the terminal device sends and/or receives the first information, a time length that needs to be reserved between two times of sending the first information by the terminal device, or a time length that needs to be reserved between two times of receiving the first information by the terminal device.

The tuning time information is switching time between one time of sending first information by the terminal device and next time of sending first information, or switching time between one time of receiving first information by the terminal device and next time of receiving first information.

The nonsimultaneous transmit information indicates that when sending the first information, the terminal device does not support sending information other than the first information.

The nonsimultaneous receive information indicates that when receiving the first information, the terminal device does not support receiving information other than the first information.

In an implementation, the first configuration information includes a configuration of a manner of sending and/or receiving the first information.

The manner of sending and/or receiving the first information includes: The terminal device sends and/or receives the first information based on the first capability information, or the terminal device sends and/or receives the first information based on the second capability information; or the manner of sending and/or receiving the first information includes: The terminal device generates the first information according to the first algorithm, or generates the first information according to the second algorithm, where the first algorithm and the second algorithm are different algorithms.

In an implementation, the first configuration information includes information about sending and/or receiving the first information.

The information about sending and/or receiving the first information includes at least one of the following: scrambling code information, location information, period information, interval information, frequency hopping information, density information, guard time information, tuning time information, nonsimultaneous transmit information, and nonsimultaneous receive information.

The scrambling code information includes at least one of the following: a scrambling code range and a scrambling code value set.

The location information is a location at which the first information is sent and/or received and that can be supported by the terminal device.

The period information is a period in which the first information is sent and/or received and that can be supported by the terminal device.

The interval information is an interval that is between two consecutive times of sending and/or receiving the first information and that can be supported by the terminal device.

The frequency hopping information is one or more of whether the terminal device supports sending and/or receiving the first information in a frequency hopping manner, a quantity of hops for sending and/or receiving the first information in a specific time, a quantity of resource blocks RBs occupied for sending and/or receiving the first information at each hop, a resource width for sending and/or receiving the first information corresponding to each hop, a frequency hopping offset for sending and/or receiving the first information, a frequency resource range for sending and/or receiving the first information in a frequency hopping manner, and subcarrier spacing information for sending and/or receiving the first information.

The density information is a quantity of times that the terminal device sends and/or receives the first information within a specific time range.

The reserved time information is a time length that needs to be reserved before the terminal device sends and/or receives the first information, a time length that needs to be reserved after the terminal device sends and/or receives the first information, a time length that needs to be reserved between two times of sending the first information by the terminal device, or a time length that needs to be reserved between two times of receiving the first information by the terminal device.

The tuning time information is switching time between one time of sending first information by the terminal device and next time of sending first information, or switching time between one time of receiving first information by the terminal device and next time of receiving first information.

The nonsimultaneous transmit information indicates that when sending the first information, the terminal device does not support sending information other than the first information.

The nonsimultaneous receive information indicates that when receiving the first information, the terminal device does not support receiving information other than the first information.

The first configuration information includes at least one of the following: whether frequency hopping is enabled, a frequency hopping time domain configuration, and a frequency hopping frequency domain configuration.

The frequency hopping time domain configuration includes at least one of the following: a start location, an interval, a period, a quantity of symbols occupied by each hop, and a frame or slot configuration.

The frequency hopping frequency domain configuration includes at least one of the following: a start RB location, a quantity of RBs occupied by each hop, a resource width corresponding to each hop, a quantity of hops on a frequency corresponding to a specific time, a frequency resource range of frequency hopping, subcarrier spacing information, and a frequency hopping offset.

In an implementation, the first configuration information indicates one of the following manners of sending and/or receiving the first information: {first mode, no frequency hopping}, {second mode, frequency hopping}, and {second mode, no frequency hopping}.

The first mode indicates that the terminal device sends and/or receives the first information based on the first capability information.

The second mode indicates that the terminal device sends and/or receives the first information based on the second capability information.

The no frequency hopping indicates that the terminal device does not support sending and/or receiving the first information in a frequency hopping manner.

The frequency hopping indicates that the terminal device supports sending and/or receiving the first information in a frequency hopping manner.

In an implementation, the first configuration information indicates that a manner of sending and/or receiving the first information is one of the following: {first mode, no frequency hopping}, {second mode, frequency hopping}, {second mode, no frequency hopping}, or {first mode, frequency hopping}.

The first mode indicates that the terminal device sends and/or receives the first information based on the first capability information.

The second mode indicates that the terminal device sends and/or receives the first information based on the second capability information.

The no frequency hopping indicates that the terminal device does not support sending and/or receiving the first information in a frequency hopping manner.

The frequency hopping indicates that the terminal device supports sending and/or receiving the first information in a frequency hopping manner.

In an implementation, the terminal device sends and/or receives the first information in a predefined sending and/or receiving manner.

The predefined sending and/or receiving manner includes at least one of the following:

when a quantity of resources occupied for sending and/or receiving the first information is greater than or equal to the second quantity, sending and/or receiving, by the terminal device, the first information in a no frequency hopping manner;

when a quantity of resources occupied for sending and/or receiving the first information is not greater than the second quantity, sending and/or receiving, by the terminal device, the first information in a frequency hopping manner, or sending and/or receiving, by the terminal device, the first information based on a frequency hopping indication;

when a quantity of resources occupied for sending and/or receiving the first information is greater than or equal to the first quantity, sending and/or receiving, by the terminal device, the first information in a carrier aggregation manner; or when a quantity of resources occupied for sending and/or receiving the first information is not greater than the first quantity, sending and/or receiving, by the terminal device, the first information in a single carrier manner.

In an implementation, the first network device is a positioning server, and the second network device is a base station; or the first network device and the second network device are a same base station.

Figure 5:
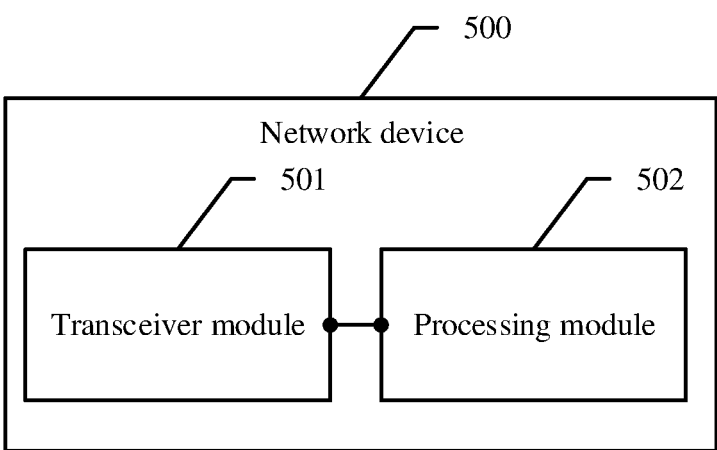
FIG. 5 is a diagram of a network device according to an embodiment of this application.

As shown in FIG. 5, an embodiment of this application provides a communication apparatus. The communication apparatus may be a network device, an apparatus in the network device, or an apparatus that can be collaboratively used with the network device. FIG. 5 is shown by using an example in which the communication apparatus is a network device 500. The network device 500 may include a transceiver module 501 and a processing module 502.

The processing module is configured to receive, by using the transceiver module, first capability information transmitted by a terminal device, where the first capability information indicates that the terminal device supports sending and/or receiving first information by using a maximum of a first quantity of resources, and the first information includes a reference signal.

The processing module is configured to receive, by using the transceiver module, second capability information transmitted by the terminal device, where the second capability information indicates that the terminal device supports sending and/or receiving second information by using a maximum of a second quantity of resources, and the second information includes at least one of the following: data or control information.

The processing module is configured to send first configuration information to the terminal device by using the transceiver module, where the first configuration information indicates that a quantity of resources configured for the first information is not greater than the first quantity.

The processing module is configured to send second configuration information to the terminal device by using the transceiver module, where the second configuration information indicates that a quantity of resources configured for the second information is not greater than the second quantity.

In an implementation, the first quantity is greater than the second quantity.

In an implementation, the processing module is configured to receive, by using the transceiver module, third capability information sent by the terminal device.

The third capability information indicates:

whether the terminal device supports sending and/or receiving the first information in a carrier aggregation manner; and/or the terminal device supports sending and/or receiving the first information by using a maximum of M carriers, where M is a positive integer.

In an implementation, the processing module is configured to receive, by using the transceiver module, fourth capability information sent by the terminal device.

The fourth capability information indicates:

the terminal device does not support sending and/or receiving the second information in a carrier aggregation manner; or the terminal device supports sending and/or receiving the second information by using a maximum of N carriers, where N is a positive integer.

In an implementation, the processing module is configured to receive, by using the transceiver module, fifth capability information sent by the terminal device.

The fifth capability information indicates:

the terminal device supports generating the first information according to a first algorithm;

the terminal device supports generating the first information according to a second algorithm; or the terminal device supports generating the first information according to a first algorithm and a second algorithm.

The first algorithm and the second algorithm are different algorithms.

In an implementation, the processing module is configured to receive, by using the transceiver module, sixth capability information sent by the terminal device.

The sixth capability information includes at least one type of the following information: scrambling code information, location information, period information, interval information, frequency hopping information, density information, reserved time information, tuning time information, nonsimultaneous transmit information, and nonsimultaneous receive information.

The scrambling code information includes at least one of the following: a scrambling code range and a scrambling code value set.

The location information is a location at which the first information is sent and/or received and that can be supported by the terminal device.

The period information is a period in which the first information is sent and/or received and that can be supported by the terminal device.

The interval information is an interval that is between two consecutive times of sending and/or receiving the first information and that can be supported by the terminal device.

The frequency hopping information is one or more of whether the terminal device supports sending and/or receiving the first information in a frequency hopping manner, a quantity of hops for sending and/or receiving the first information in a specific time, a quantity of resource blocks RBs occupied for sending and/or receiving the first information at each hop, a resource width for sending and/or receiving the first information corresponding to each hop, a frequency hopping offset for sending and/or receiving the first information, a frequency resource range for sending and/or receiving the first information in a frequency hopping manner, and subcarrier spacing information for sending and/or receiving the first information.

The density information is a quantity of times that the terminal device sends and/or receives the first information within a specific time range.

The reserved time information is a time length that needs to be reserved before the terminal device sends and/or receives the first information, a time length that needs to be reserved after the terminal device sends and/or receives the first information, a time length that needs to be reserved between two times of sending the first information by the terminal device, or a time length that needs to be reserved between two times of receiving the first information by the terminal device.

The tuning time information is switching time between one time of sending first information by the terminal device and next time of sending first information, or switching time between one time of receiving first information by the terminal device and next time of receiving first information.

The nonsimultaneous transmit information indicates that when sending the first information, the terminal device does not support sending information other than the first information.

The nonsimultaneous receive information indicates that when receiving the first information, the terminal device does not support receiving information other than the first information.

In an implementation, the first configuration information includes:

a configuration of a manner of sending and/or receiving the first information.

The manner of sending and/or receiving the first information includes: The terminal device sends and/or receives the first information based on the first capability information, or the terminal device sends and/or receives the first information based on the second capability information; or the manner of sending and/or receiving the first information includes: The terminal device generates the first information according to the first algorithm, or generates the first information according to the second algorithm, where the first algorithm and the second algorithm are different algorithms.

In an implementation, the first configuration information includes information about sending and/or receiving the first information.

The information about sending and/or receiving the first information includes at least one of the following: scrambling code information, location information, period information, interval information, frequency hopping information, density information, guard time information, tuning time information, nonsimultaneous transmit information, and nonsimultaneous receive information.

The scrambling code information includes at least one of the following: a scrambling code range and a scrambling code value set.

The location information is a location at which the first information is sent and/or received and that can be supported by the terminal device.

The period information is a period in which the first information is sent and/or received and that can be supported by the terminal device.

The interval information is an interval that is between two consecutive times of sending and/or receiving the first information and that can be supported by the terminal device.

The frequency hopping information is one or more of whether the terminal device supports sending and/or receiving the first information in a frequency hopping manner, a quantity of hops for sending and/or receiving the first information in a specific time, a quantity of resource blocks RBs occupied for sending and/or receiving the first information at each hop, a resource width for sending and/or receiving the first information corresponding to each hop, a frequency hopping offset for sending and/or receiving the first information, a frequency resource range for sending and/or receiving the first information in a frequency hopping manner, and subcarrier spacing information for sending and/or receiving the first information.

The density information is a quantity of times that the terminal device sends and/or receives the first information within a specific time range.

The reserved time information is a time length that needs to be reserved before the terminal device sends and/or receives the first information, a time length that needs to be reserved after the terminal device sends and/or receives the first information, a time length that needs to be reserved between two times of sending the first information by the terminal device, or a time length that needs to be reserved between two times of receiving the first information by the terminal device.

The tuning time information is switching time between one time of sending first information by the terminal device and next time of sending first information, or switching time between one time of receiving first information by the terminal device and next time of receiving first information.

The nonsimultaneous transmit information indicates that when sending the first information, the terminal device does not support sending information other than the first information.

The nonsimultaneous receive information indicates that when receiving the first information, the terminal device does not support receiving information other than the first information.

In an implementation, the first configuration information includes at least one of the following: whether frequency hopping is enabled, a frequency hopping time domain configuration, and a frequency hopping frequency domain configuration.

The frequency hopping time domain configuration includes at least one of the following: a start location, an interval, a period, a quantity of symbols occupied by each hop, and a frame or slot configuration.

The frequency hopping frequency domain configuration includes at least one of the following: a start RB location, a quantity of RBs occupied by each hop, a resource width corresponding to each hop, a quantity of hops on a frequency corresponding to a specific time, a frequency resource range of frequency hopping, subcarrier spacing information, and a frequency hopping offset.

In an implementation, the first configuration information indicates one of the following manners of sending and/or receiving the first information: {first mode, no frequency hopping}, {second mode, frequency hopping}, and {second mode, no frequency hopping}.

The first mode indicates that the terminal device sends and/or receives the first information based on the first capability information.

The second mode indicates that the terminal device sends and/or receives the first information based on the second capability information.

The no frequency hopping indicates that the terminal device does not support sending and/or receiving the first information in a frequency hopping manner.

The frequency hopping indicates that the terminal device supports sending and/or receiving the first information in a frequency hopping manner.

In an implementation, the first configuration information indicates that a manner of sending and/or receiving the first information is one of the following: {first mode, no frequency hopping}, {second mode, frequency hopping}, {second mode, no frequency hopping}, or {first mode, frequency hopping}.

The first mode indicates that the terminal device sends and/or receives the first information based on the first capability information.

The second mode indicates that the terminal device sends and/or receives the first information based on the second capability information.

The no frequency hopping indicates that the terminal device does not support sending and/or receiving the first information in a frequency hopping manner.

The frequency hopping indicates that the terminal device supports sending and/or receiving the first information in a frequency hopping manner.

In an implementation, the terminal device sends and/or receives the first information in a predefined sending and/or receiving manner.

The predefined sending and/or receiving manner includes at least one of the following:

when a quantity of resources occupied for sending and/or receiving the first information is greater than or equal to the second quantity, sending and/or receiving, by the terminal device, the first information in a no frequency hopping manner;

when a quantity of resources occupied for sending and/or receiving the first information is not greater than the second quantity, sending and/or receiving, by the terminal device, the first information in a frequency hopping manner, or sending and/or receiving, by the terminal device, the first information based on a frequency hopping indication;

when a quantity of resources occupied for sending and/or receiving the first information is greater than or equal to the first quantity, sending and/or receiving, by the terminal device, the first information in a carrier aggregation manner; or when a quantity of resources occupied for sending and/or receiving the first information is not greater than the first quantity, sending and/or receiving, by the terminal device, the first information in a single carrier manner.

Division into the modules in embodiments of this application is an example, is merely division into logical functions, and may be other division during actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module.

Figure 6:
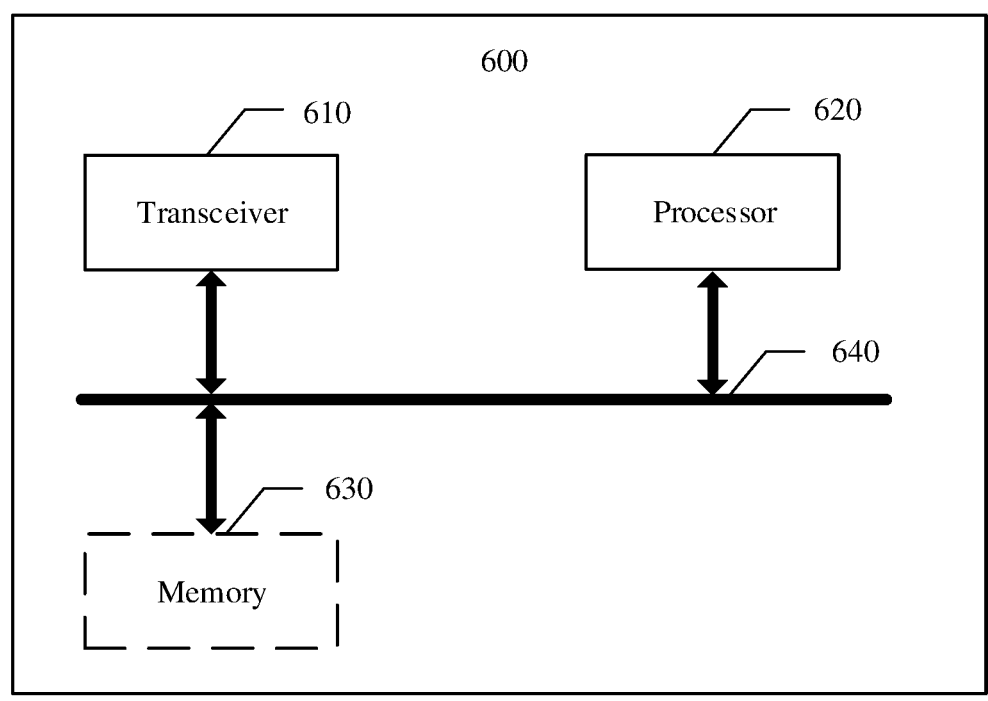
FIG. 6 is a diagram of a terminal device according to an embodiment of this application.

FIG. 6 shows an apparatus 600 according to an embodiment of this application. The apparatus 600 is configured to implement functions of the terminal device in the foregoing method. The apparatus may be a terminal device, an apparatus in a terminal device, or an apparatus that can be used together with a terminal device. The apparatus may be a chip system. In this embodiment of this application, the chip system may include a chip, or may include a chip and another discrete component. The apparatus 600 includes at least one processor 620, configured to implement the functions of the terminal device in the method provided in embodiments of this application. For example, the processor 620 may receive information such as downlink control information and configuration information of a control resource set, and parse the foregoing information. For details, refer to detailed descriptions in the method example. Details are not described herein again.

The apparatus 600 may further include at least one memory 630, configured to store program instructions and/or data. The memory 630 is coupled to the processor 620. The coupling in this embodiment of this application may be an indirect coupling or a communication connection between apparatuses, units, or modules in an electrical form, a mechanical form, or another form, and is used for information exchange between the apparatuses, the units, or the modules. The processor 620 may cooperate with the memory 630. The processor 620 may execute the program instructions stored in the memory 630. At least one of the at least one memory may be included in the processor.

The apparatus 600 may further include a communication interface. There are a plurality of implementations for the communication interface. For example, the communication interface may be a transceiver, an interface, a bus, a circuit, a pin, or an apparatus that can implement a receiving and sending function. FIG. 6 shows an example in which the communication interface is a transceiver 610. The transceiver 610 is configured to communicate with another device through a transmission medium, so that the apparatus in the apparatus 600 can communicate with the another device. For example, the another device may be a network device. The processor 620 receives or sends data by using the transceiver 610, and is configured to implement the method performed by the terminal device in the embodiment corresponding to FIG. 1.

A connection medium between the transceiver 610, the processor 620, and the memory 630 is not limited in this embodiment of this application. In this embodiment of this application, the memory 630, the processor 620, and the transceiver 610 are connected by using a bus 640 in FIG. 6. The bus is represented by using a bold line in FIG. 6. A manner of a connection between other components is merely an example for description, and imposes no limitation. The bus may be classified into an address bus, a data bus, a control bus, and the like. For ease of indication, the bus is indicated by using only one bold line in FIG. 6. However, it does not indicate that there is only one bus or only one type of bus.

Figure 7:
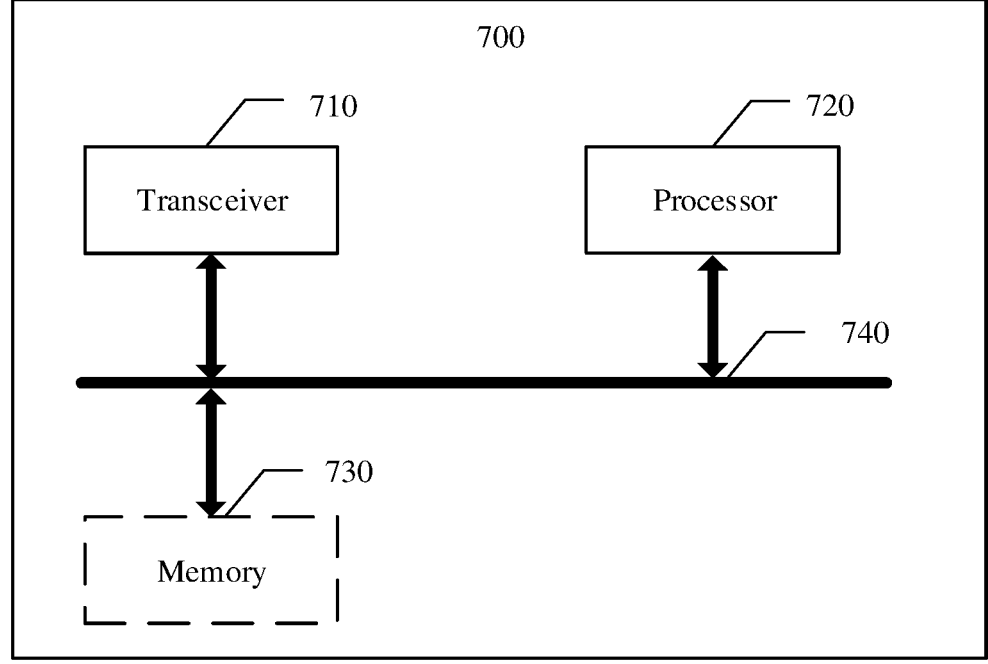
FIG. 7 is a diagram ture of a network device according to an embodiment of this application.

FIG. 7 shows an apparatus 700 according to an embodiment of this application. The apparatus 700 is configured to implement functions of the network device in the foregoing method. The apparatus may be a network device, an apparatus in the network device, or an apparatus that can be collaboratively used with the network device. The apparatus may be a chip system. The apparatus 700 includes at least one processor 720, configured to implement the functions of the network device in the method provided in embodiments of this application. For example, the processor 720 may generate and send information such as downlink control information and configuration information of a control resource set. For details, refer to detailed descriptions in the method example. Details are not described herein again.

The apparatus 700 may further include at least one memory 730, configured to store program instructions and/or data. The memory 730 is coupled to the processor 720. The coupling in this embodiment of this application may be an indirect coupling or a communication connection between apparatuses, units, or modules in an electrical form, a mechanical form, or another form, and is used for information exchange between the apparatuses, the units, or the modules. The processor 720 may cooperate with the memory 730. The processor 720 may execute the program instruction stored in the memory 730. At least one of the at least one memory may be included in the processor.

The apparatus 700 may further include a communication interface. There are a plurality of implementations for the communication interface. For example, the communication interface may be a transceiver, an interface, a bus, a circuit, or an apparatus that can implement a receiving and sending function. FIG. 7 shows an example in which the communication interface is a transceiver 710. The transceiver 710 is configured to communicate with another device through a transmission medium, so that the apparatus in the apparatus 700 can communicate with the another device. For example, the another device may be a terminal device. The processor 720 receives or sends data by using the transceiver 710, and is configured to implement the method performed by the network device in the embodiment corresponding to FIG. 1.

A connection medium between the transceiver 710, the processor 720, and the memory 730 is not limited in this embodiment of this application. In this embodiment of this application, in FIG. 7, the memory 730, the processor 720, and the transceiver 710 are connected through a bus 740, and the bus is represented by a bold line in FIG. 7. A connection manner between other parts is merely an example for description, and does not impose a limitation. The bus may be classified into an address bus, a data bus, a control bus, and the like. For ease of indication, the bus is indicated by using only one bold line in FIG. 7. However, it does not indicate that there is only one bus or only one type of bus.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor or any conventional processor or the like. The steps of the method disclosed with reference to embodiments of this application may be directly performed by a hardware processor, or may be performed by using a combination of hardware in the processor and a software module.

In embodiments of this application, the memory may be a non-volatile memory, for example, a hard disk drive (HDD) or a solid-state drive (SSD), or may be a volatile memory, for example, a random access memory (RAM). The memory is any other medium that can carry or store expected program code in a structural form of instructions or data and that can be accessed by a computer, but is not limited thereto. The memory in embodiments of this application may alternatively be a circuit or any other apparatus that can implement a storage function, and is configured to store the program instructions and/or the data.

All or a part of the technical solutions provided in embodiments of this application may be implemented by using software, hardware, firmware, or any combination thereof. When software is used to implement embodiments, all or a part of embodiments may be implemented in a form of a computer program product. The computer program product includes one or more computer instructions. When the computer program instructions are loaded and executed on the computer, the procedure or functions according to embodiments of the present disclosure are all or partially generated. The computer may be a general-purpose computer, a dedicated computer, a computer network, a network device, a terminal device, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium, or the like.

In embodiments of this application, when there is no logical conflict, embodiments may be mutually referenced. For example, methods and/or terms in the method embodiments may be mutually referenced, and functions and/or terms in the apparatus embodiments may be mutually referenced. For example, functions and/or terms between the apparatus embodiments and the method embodiments may be mutually referenced.

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A communication method performed by a terminal device or a chip in the terminal device, the method comprising:

transmitting first capability information indicating a first bandwidth size which is a maximum bandwidth supported by the terminal device for sending a sounding reference signal (SRS);

transmitting second capability information indicating a second bandwidth size which is a maximum bandwidth supported by the terminal device for sending data or control information, wherein the first bandwidth size is greater than the second bandwidth size;

obtaining first configuration information, wherein a size of bandwidth for the SRS indicated by the first configuration information is not greater than the first bandwidth size; and obtaining second configuration information, wherein a size of bandwidth for the data or control information indicated by the second configuration information is not greater than the second bandwidth size.

2. The method according to claim 1, wherein the first bandwidth size belongs to a first bandwidth size set, and at least one bandwidth size in the first bandwidth size set is greater than the second bandwidth size.

3. The method according to claim 1, wherein the method further comprises:

sending third capability information indicating one or both of:

whether the terminal device supports sending and/or receiving the SRS in a carrier aggregation manner; or the terminal device supports sending and/or receiving the SRS using a maximum of M carriers, wherein M is a positive integer.

4. The method according to claim 1, wherein the method further comprises:

sending fourth capability information indicating one of:

the terminal device does not support sending and/or receiving the data or control information in a carrier aggregation manner; or the terminal device supports sending and/or receiving the data or control information using a maximum of N carriers, wherein N is a positive integer.

5. The method according to claim 4, wherein N is less than M; or N is not greater than M.

6. The method according to claim 1, wherein the first capability information is transmitted to a base station or a location management function (LMF), and the second capability information is transmitted to a base station.

7. A non-transitory computer-readable media storing instructions that configure at least one processor, upon execution of the instructions to perform:

transmitting first capability information indicating a first bandwidth size which is a maximum bandwidth supported by a terminal device for sending a sounding reference signal (SRS);

transmitting second capability information indicating a second bandwidth size which is a maximum bandwidth supported by the terminal device for sending data or control information, wherein the first bandwidth size is greater than the second bandwidth size;

obtaining first configuration information, wherein a size of bandwidth for the SRS indicated by the first configuration information is not greater than the first bandwidth size; and obtaining second configuration information wherein a size of bandwidth for the data or control information indicated by the second configuration information is not greater than the second bandwidth size.

8. The computer-readable media according to claim 7, wherein the first bandwidth size belongs to a first bandwidth size set, and at least one bandwidth size in the first bandwidth size set is greater than the second bandwidth size.

9. The computer-readable media according to claim 7, wherein the at least one processor further executes the instructions to perform the step of:

sending third capability information indicating one or both of:

whether the terminal device supports sending and/or receiving the SRS in a carrier aggregation manner; or the terminal device supports sending and/or receiving the SRS using a maximum of M carriers, wherein M is a positive integer.

10. The computer-readable media according to claim 7, wherein the at least one processor further executes the instructions to perform the step of:

sending fourth capability information indicating one of:

the terminal device does not support sending and/or receiving the data or control information in a carrier aggregation manner; or the terminal device supports sending and/or receiving the data or control information using a maximum of N carriers, wherein N is a positive integer.

11. The computer-readable media according to claim 10, wherein N is less than M; or N is not greater than M.

12. The computer-readable storage medium according to claim 7, wherein the first capability information is transmitted to a base station or a location management function (LMF), the second capability information is transmitted to a base station.

13. An apparatus, comprising:

a memory storing instructions; and at least one processor in communication with the memory, the at least one processor is configured, upon execution of the instructions, to perform the following steps:

transmitting first capability information indicating a first bandwidth size which is a maximum bandwidth supported by a terminal device for sending a sounding reference signal (SRS);

transmitting second capability information indicating a second bandwidth size which is a maximum bandwidth supported by the terminal device for sending data or control information, wherein the first bandwidth size is greater than the second bandwidth size;

obtaining first configuration information, wherein a size of bandwidth for the SRS indicated by the first configuration information is not greater than the first bandwidth size; and obtaining second configuration information, wherein a size of bandwidth for the data or control information indicated by the second configuration information is not greater than the second bandwidth size.

14. The apparatus according to claim 13, wherein the first bandwidth size belongs to a first bandwidth size set, and at least one bandwidth size in the first bandwidth size set is greater than the second bandwidth size.

15. The apparatus according to claim 13, wherein the at least one processor further executes the instructions to perform the step of:

sending third capability information indicating one or both of:

whether the terminal device supports sending and/or receiving the SRS in a carrier aggregation manner; or the terminal device supports sending and/or receiving the SRS using a maximum of M carriers, wherein M is a positive integer.

16. The apparatus according to claim 13, wherein the at least one processor further executes the instructions to perform the step of:

sending fourth capability information indicating one of:

the terminal device does not support sending and/or receiving the data or control information in a carrier aggregation manner; or the terminal device supports sending and/or receiving the data or control information by using a maximum of N carriers, wherein N is a positive integer.

17. The apparatus according to claim 16, wherein N is less than M; or

N is not greater than M.

18. The apparatus according to claim 13, wherein the first capability information is transmitted to a base station or a location management function (LMF), the second capability information is transmitted to a base station.

* * * * *